US009806934B2

(12) United States Patent
Eteminan et al.

(10) Patent No.: US 9,806,934 B2
(45) Date of Patent: Oct. 31, 2017

(54) AUTOMATED DELIVERY OF MULTIMEDIA CONTENT

(71) Applicant: foneClay, Inc., Rancho Santa Fe, CA (US)

(72) Inventors: Isaac Eshagh Eteminan, Rancho Santa Fe, CA (US); Scott Dresden, Los Angeles, CA (US); James William Bishop, Jr., Colorado Springs, CO (US)

(73) Assignee: FONECLAY, INC, Rancho Santa Fe, CA (US)

( * ) Notice: Subject to any disclaimer, the term of this patent is extended or adjusted under 35 U.S.C. 154(b) by 564 days.

(21) Appl. No.: 13/859,707

(22) Filed: Apr. 9, 2013

(65) Prior Publication Data

US 2014/0164514 A1    Jun. 12, 2014

Related U.S. Application Data

(60) Provisional application No. 61/735,159, filed on Dec. 10, 2012.

(51) Int. Cl.
*G06F 15/16* (2006.01)
*H04L 29/06* (2006.01)
*H04L 29/08* (2006.01)

(52) U.S. Cl.
CPC ........ *H04L 29/06176* (2013.01); *H04L 67/42* (2013.01); *H04L 67/06* (2013.01)

(58) Field of Classification Search
CPC ... G06F 15/16; G06F 1/10; G06F 1/30; H04L 29/06176; H04L 67/42; H04L 67/06; H04L 29/06
See application file for complete search history.

(56) References Cited

U.S. PATENT DOCUMENTS

| | | | | |
|---|---|---|---|---|
| 8,261,231 | B1 * | 9/2012 | Hirsch et al. | 717/100 |
| 8,577,419 | B2 * | 11/2013 | Kim | G06F 3/0481 |
| | | | | 455/566 |
| 8,775,976 | B2 * | 7/2014 | Moon | G06F 3/048 |
| | | | | 345/629 |
| 2002/0035595 | A1 * | 3/2002 | Yen | G06F 9/4443 |
| | | | | 709/203 |
| 2002/0087656 | A1 | 7/2002 | Gargiulo et al. | |
| 2003/0065802 | A1 * | 4/2003 | Vitikainen et al. | 709/231 |
| 2003/0191816 | A1 * | 10/2003 | Landress et al. | 709/219 |
| 2004/0043770 | A1 | 3/2004 | Amit et al. | |

(Continued)

*Primary Examiner* — Benjamin M Thieu
(74) *Attorney, Agent, or Firm* — Thomas D. Foster; Bruce Hare

(57) ABSTRACT

A system adapted to provide multimedia content to a set of users is described. The system includes: a storage adapted to store at least one multimedia content item, each multimedia content item associated with a publisher-user; a set of destination devices, each destination device associated with a subscriber-user, each subscriber-user being associated with the publisher-user; and a server adapted to provide each multimedia content item to the set of destination devices. A method adapted to allow a creator to generate and distribute at least one multimedia content item to a set of subscribers is also described. In addition, a server application adapted to provide at least one multimedia content item to a set of destination devices is described. Furthermore, a server application adapted to allow a creator to compose a multimedia content item is described.

21 Claims, 21 Drawing Sheets

(56) References Cited

U.S. PATENT DOCUMENTS

| | | | |
|---|---|---|---|
| 2007/0132783 A1* | 6/2007 | Lim | G06T 11/60 |
| | | | 345/629 |
| 2007/0262950 A1* | 11/2007 | Lai | G09G 5/14 |
| | | | 345/156 |
| 2008/0022010 A1* | 1/2008 | Franklin et al. | 709/231 |
| 2009/0089352 A1* | 4/2009 | Davis et al. | 709/201 |
| 2010/0075649 A1* | 3/2010 | Teng | H04M 1/72544 |
| | | | 455/418 |
| 2010/0325259 A1* | 12/2010 | Schuler | G06F 11/3055 |
| | | | 709/224 |
| 2010/0328492 A1* | 12/2010 | Fedorovskaya | G06Q 30/02 |
| | | | 348/231.2 |
| 2011/0161912 A1 | 6/2011 | Eteminan et al. | |
| 2012/0054278 A1* | 3/2012 | Taleb et al. | 709/204 |
| 2013/0305189 A1* | 11/2013 | Kim | G06F 3/0482 |
| | | | 715/838 |

* cited by examiner

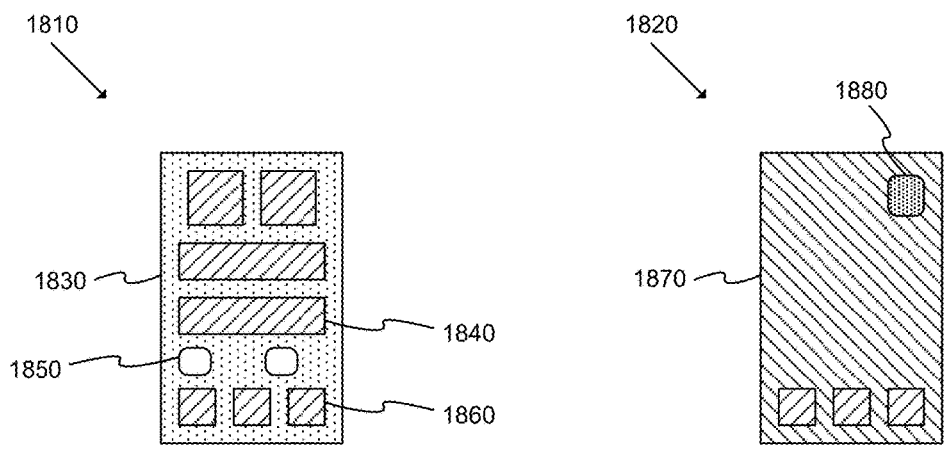
FIG. 18
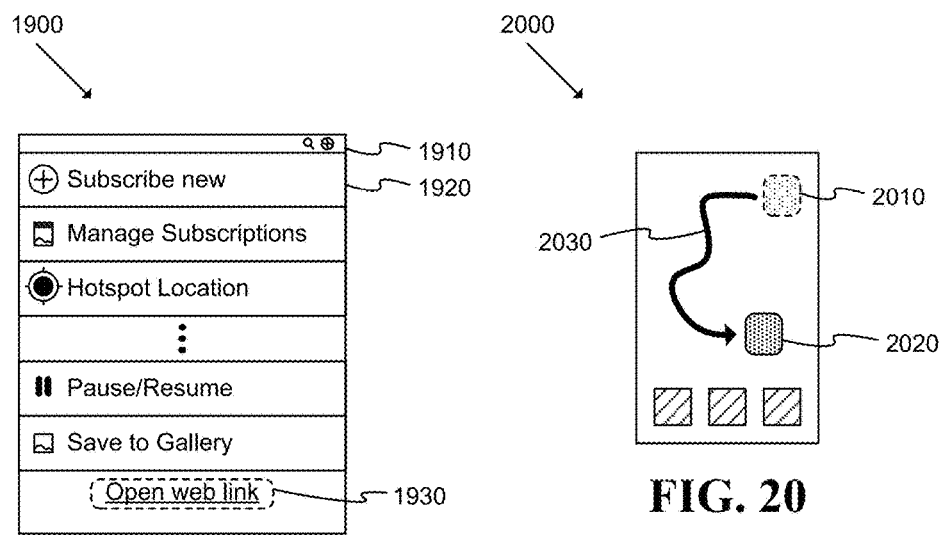
FIG. 19
FIG. 20

AUTOMATED DELIVERY OF MULTIMEDIA CONTENT

CROSS-REFERENCE TO RELATED APPLICATIONS

This application claims priority to U.S. Provisional Patent Application Ser. No. 61/735,159, filed on Dec. 10, 2012.

BACKGROUND

Many celebrities, athletes, corporations, and/or other appropriate entities may have various groups of followers (or fans) that are interested in receiving content associated with the entity. Usually, followers have to actively procure information regarding the entity (e.g., by performing an online search, visiting various social media sites, etc.). Alternatively, the entity may publish information through various online outlets (e.g., a web site, a messaging service, etc.). Such published content may not be received by the followers of the entity until each follower retrieves the information from the outlet(s).

Thus there is a need for a system that allows each entity (or creator) to automatically push content to devices associated with a set of subscribers without requiring any special action to be taken by the subscribers.

BRIEF SUMMARY

Some embodiments provide an online system that allows creators to generate content and provide the content directly to a set of subscribers. A user may access a website (or other resource) in order to subscribe to one or more creators. In addition, users may be able to download and install a user device application that may facilitate various operations performed by some embodiments.

Some embodiments provide resources that allow a creator to generate content using various predefined templates. In addition, a composition studio may allow content to be generated by combining various disparate elements from various sources into a single multimedia content element. The content may then be automatically pushed to devices (e.g., smartphones) associated with the set of subscribers.

Some embodiments may provide various web-based (and/or application-based) graphical user interfaces (GUIs) that may allow creators to easily generate and distribute content and subscribers to automatically receive the content.

A first exemplary embodiment includes a system adapted to provide multimedia content to a set of users. The system includes: a storage adapted to store at least one multimedia content item, each multimedia content item associated with a publisher-user; a set of destination devices, each destination device associated with a subscriber-user, each subscriber-user being associated with the publisher-user; and a server adapted to provide each multimedia content item to the set of destination devices.

A second exemplary embodiment includes a method adapted to allow a creator to generate and distribute at least one multimedia content item to a set of subscribers. The method includes: providing an online composition tool adapted to capture and compose elements of a particular multimedia content item; providing multiple distribution templates, receiving a selection of a particular distribution template, and applying the particular distribution template to the particular multimedia content item; setting values for metadata associated with the particular multimedia content item and properties for controlling distribution of the particular multimedia content item; uploading the particular multimedia content item to a distribution server in order to make the particular multimedia content item available to the set of subscribers; and pushing the particular multimedia content item to a plurality of devices, each device associated with a particular subscriber from the set of subscribers.

A third exemplary embodiment includes a server application adapted to provide at least one multimedia content item to a set of destination devices. The server application includes sets of instructions for: retrieving a particular multimedia content item from a storage adapted to store multimedia content items composed by a set of creators; offering a listing of multimedia content items that are available to users to select, download, and install; and based upon satisfactions of a set of evaluation criteria, pushing the at least one multimedia content item to the set destination devices, where each destination device in the set is associated with a user that has selected content offered by a creator associated with the at least one multimedia content item.

A fourth exemplary embodiment includes a server application adapted to allow a creator to compose a multimedia content item. The server application includes sets of instructions for: providing an online composition tool adapted to allow the creator to capture and compose elements of the multimedia content item; offering at least one distribution template that may be applied to the multimedia content item; setting values for metadata associated with the multimedia content item and properties for controlling distribution of the multimedia content item; and sending the multimedia content item to a distribution server such that the multimedia content item is made available to subscribers.

The preceding Summary is intended to serve as a brief introduction to some embodiments of the invention. It is not meant to be an introduction or overview of all inventive subject matter disclosed in this document. The Detailed Description that follows and the Drawings (or "Figures" or "FIGS.") that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matter is not to be limited by the illustrative details in the Summary, Detailed Description and the Drawings, but rather is to be defined by the appended claims, because the claimed subject matter may be embodied in other specific forms without departing from the spirit of the invention.

BRIEF DESCRIPTION OF THE DRAWINGS

The novel features of the invention are set forth in the appended claims. However, for purpose of explanation, several embodiments of the invention are set forth in the following drawings.

FIG. 18 illustrates example feed GUIs provided by some embodiments;

FIG. 19 illustrates a subscriber GUI that may allow a user to define various preferences associated with operation of a mobile device application of some embodiments;

FIG. 20 illustrates a subscriber GUI that may allow a user to define a location of a hotspot;

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Generally, some embodiments of the invention provide ways for artists (and/or other content producers, merchants, etc.) to generate multimedia content and control the operations of a set of user devices such that the multimedia content is automatically provided to each user through an associated user device. Such multimedia content may be presented as, for instance, "wallpaper" on a smartphone. Such wallpaper may be able to be automatically updated by an artist such that a display of each user device associated with a user associated with the artist may be directed to display the wallpaper selected by the artist. In this way, an artist may be able to simultaneously update content provided to multiple fans.

In some embodiments, the multimedia content may be updated using an application capable of running on a user device. Once the user installs the application and associates with an artist, content may be automatically provided to the user device. Such content may be updated based on various appropriate factors.

Several more detailed embodiments of the invention are described in the sections below. Section I provides a conceptual overview of a system and process used by some embodiments. Section II then describes a conceptual system architecture used by some embodiments. Next, Section III describes various methods of operation used by some embodiments. Section IV then describes various exemplary implementations provided by some embodiments. Lastly, Section V describes a computer system which implements some of the embodiments of the invention.

I. Overview

Figure 1:
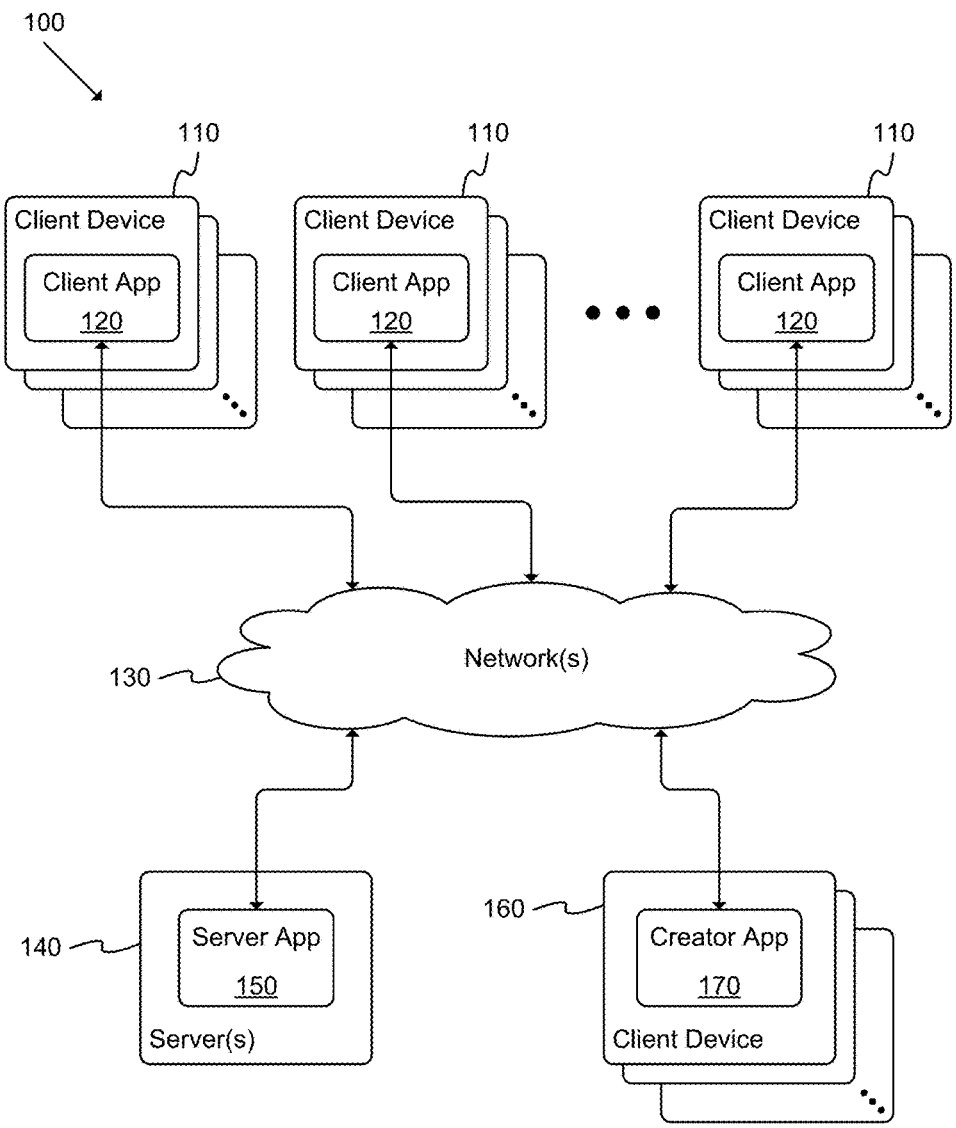
FIG. 1 illustrates a schematic diagram of a conceptual system according to an exemplary embodiment the invention.

FIG. 1 illustrates a schematic diagram of a conceptual system 100 according to an exemplary embodiment the invention. Specifically, this figure shows various components and communication pathways that may be utilized by some embodiments.

As shown, the system 100 may include multiple sets of client devices 110 (or user devices), each client device being able to execute a client application 120 (also referred to as an "app", a "mobile device application", or a "smartphone application"), one or more networks 130, at least one server 140 that is able to execute a server application 150, and a set of client devices 160 (or user devices), each client device being able to execute a creator application 170.

Each set of client devices 110 may be associated with a particular subscriber (and/or may be otherwise appropriately associated). Each set of client devices 160 may be associated with a particular creator (and/or may be otherwise appropriately associated). A client device 110 or 160 may be any appropriate device that is capable of presenting multimedia content, providing user interfaces, and accessing one or more networks. For instance, such user devices may include smartphones, personal computers (PCs), tablet devices, etc.

Each client application 120 and/or each creator application 170 may be able to communicate across networks 130 to a server application 150. In addition, each client application 120 and/or each creator application 170 may be adapted to generate various GUIs to allow various users to interact with the system 100. Various example GUIs are described below in Section IV. Furthermore, each client application 120 and/or each artist application 170 may be adapted to interact with and/or control various functionality and/or elements of a client device 110 or 160. For instance, client application 120 may be able to manipulate various display elements of a smartphone (e.g., wallpaper, icons, etc.). As another example, creator application 170 may able to display information to a creator through a PC monitor and receive information via a mouse and keyboard associated with the PC.

Such a client application 120 may allow a user to subscribe to content provided by various creators, set preferences associated with the presentation of such content, etc. Such a creator application 170 may allow for the creation, modification, selection, presentation, etc. of one or more multimedia content items associated with a creator and may allow a creator to upload the content to a server such that the content may be provided to various subscribers associated with the creator. In some embodiments, the client application 120 and/or creator application 170 may be at least partially implemented using various web-based elements and/or resources (e.g., using a browser to access one or more uniform resource locators (URLs), using one or more application programming interfaces (APIs) to access remote storages, etc.).

The one or more networks 130 may include, for instance, one or more cellular networks, one or more wireless networks, the Internet, and/or other networks. Various devices may connect the networks through various appropriate interfaces (e.g., hardware interfaces, software interfaces, etc.) using various appropriate communication protocols.

The server 140 may include one or more devices that are adapted to communicate across networks 130 to various client applications 120, creator applications 170, and/or other appropriate resources. The server 140 may be able to access various local and/or remote resources (e.g., storages) in addition to being able to execute one or more server applications 150.

Each server application may be able to store and retrieve system data from various appropriate storages and/or databases, communicate across one or more networks with various client applications (e.g., applications 120 and 170).

During operation, a creator may access a web site, app store, and/or other resource to download a creator application 170 (and/or use various web-based resources that don't require download of an application). The creator may then utilize the application to generate various multimedia content items (e.g., a set of images) and upload the content items to a server 140 via the creator application 170 and a server application 150. Various subscribers may each download the client application 120 (and/or access the system using an appropriate browser through a system web site) and utilize the application to subscribe to one or more creators (and/or one or more feeds associated with each creator). The client application may then interact with the server application 150 in order to provide the multimedia content to the subscriber (e.g., by displaying the set of images on a display element associated with a client device 110).

Although system 100 has been described with reference to various specific details, one of ordinary skill in the art will recognize that the system may be implemented in various different ways without departing from the spirit of the invention. For instance, although the example system 100 shows a single set of client devices 160 associated with a single creator for clarity, one of ordinary skill in the art will recognize that the system may support multiple creators, each creator being associated with a different set of subscribers.

Figure 2:
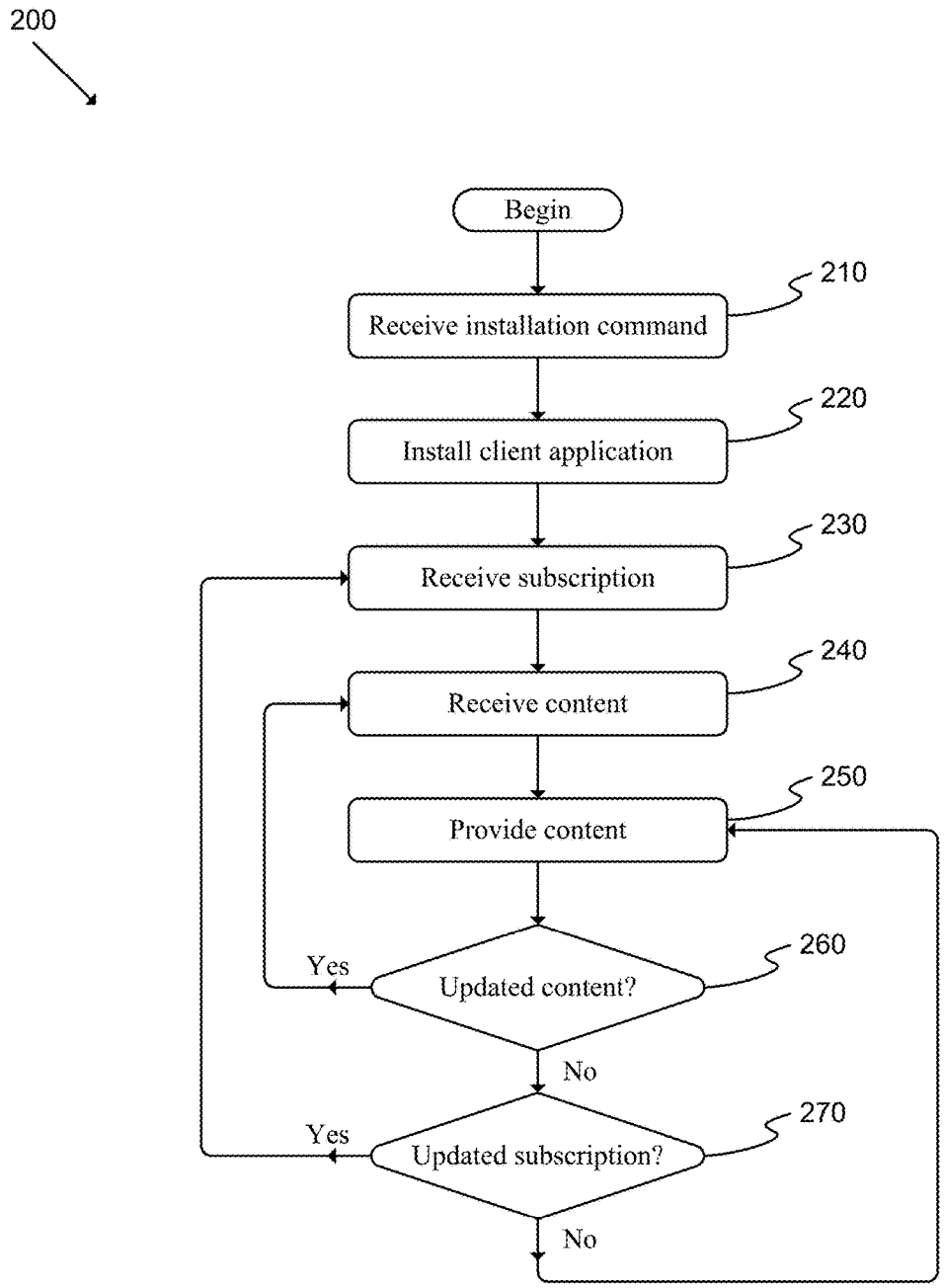
FIG. 2 illustrates a flow chart of a conceptual process provided by some embodiments.

FIG. 2 illustrates a flow chart of a conceptual process 200 provided by some embodiments. Such a process may begin, for example, when a subscriber powers on a user device.

Such a process may be implemented using a combination of client applications, creator applications, and/or server applications (and devices associated with the applications), as appropriate.

Next, the process may receive (at 210) an installation command. Such a command may be received in various appropriate ways (e.g., a user may select an application from a list of available applications in an app store, a user may use a hyperlink to access an executable file, a user may download an application from a web site, etc.). Next, the process may install (at 220) a client application. Such a client application may be similar to the client applications described above in reference to FIG. 1. The installation may include various appropriate operations.

Process 200 may then receive (at 230) subscription information. For instance, a user may select an artist or other appropriate entity (e.g., designer, brand, store, sports team, celebrity, etc.) to follow or otherwise associate with. Next, the process may receive (at 240) multimedia content associated with the subscription. The process may then present (at 250) the received multimedia content in appropriate ways (e.g., by updating the wallpaper displayed by a smartphone).

The process may then determine (at 260) whether there is updated content available. When the process determines that there is updated content, the process may receive (at 240) and present (at 250) the updated content. Otherwise, the process may continue to present (at 250) previously received content. The process may then determine (at 270) whether there is a subscription update. If the process determines there is an update, the process may repeat operations 230-270. When the process determines (at 270) that there is not a subscription update, the process may repeat operations 250-270. Operations 260-270 may be performed at various appropriate intervals, based on various appropriate conditions, etc.

Process 200 may operate periodically, continuously, and/or based on other criteria until the process is terminated (e.g., a user may uninstall an application, a mobile device may be turned off, etc.).

The process may thus allow a creator to update content, which is then automatically distributed to the various subscribers associated with the creator. Such distribution may depend at least partly on preferences of the creator, each subscriber, system defaults, availability of network resources, and/or other appropriate factors.

One of ordinary skill in the art will recognize that process 200 is conceptual in nature and may be implemented in various different ways without departing from the spirit of the invention. For instance, the process may be divided into multiple sub-processes or performed as a sub-process of a larger macro process. As another example, various operations may be performed in various orders. In addition, different operations may be included and/or various operations may be omitted.

II. System Architecture

Figure 3:
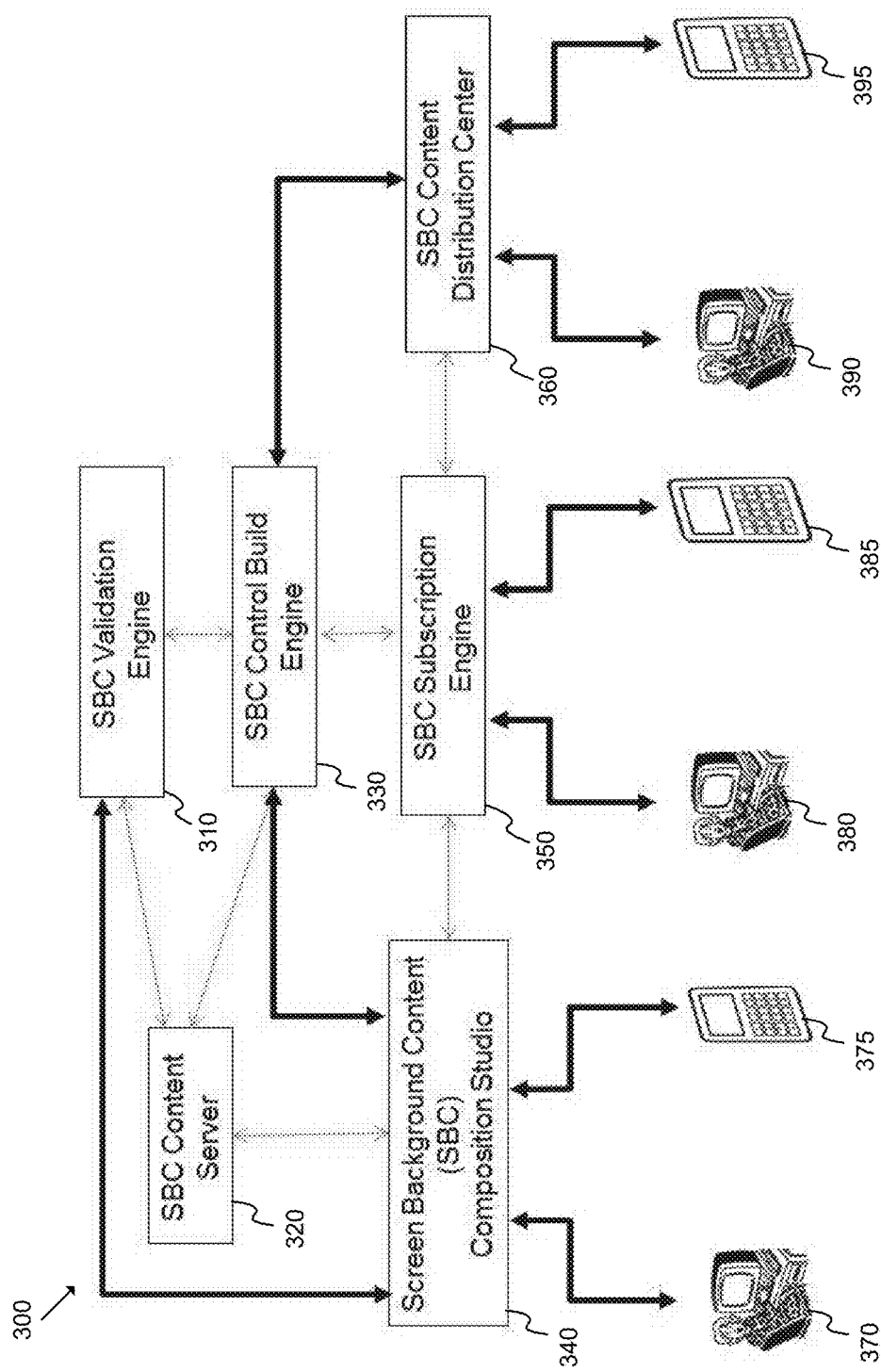
FIG. 3 illustrates a schematic block diagram of an alternative conceptual system provided by some embodiments.

FIG. 3 illustrates a schematic block diagram of an alternative conceptual system 300 provided by some embodiments. Specifically, this figure shows various system components that may be accessed and utilized by various system users.

As shown, the system may include a screen background content (SBC) validation engine 310, an SBC content server 320, an SBC control build engine 330, an SBC composition studio 340, an SBC subscription engine 350, an SBC content distribution center 360, and/or other appropriate elements.

Such elements may be able to communicate with one or more external devices 370-395.

The SBC validation engine 310 may be adapted to validate SBC. Such validation may include validation of user credentials, validation regarding format and/or size of content, and/or other appropriate factors.

The SBC content server 320 may be able to store and/or retrieve content and may be able to provide such content to various other system elements (e.g., by sending the content across one or more networks).

The SBC composition studio 340 may allow a creator to compose content to be provided to subscribers of the creator. The composition studio may also allow such content to be uploaded to and/or downloaded from the content server 320. The SBC composition studio may include various resources and features that may allow an artist-user (or creator) to generate content (including images, animation, audio/video clips, and/or other appropriate multimedia content), link to existing content, update existing content (from a portal or a mobile device), define hotspots (or clickable areas within the content), provide hotspot interaction, etc.

The SBC control build engine 330 may provide content to the SBC content distribution center 360 based on a command from the SBC composition studio 340 and data received from the SBC validation engine 310, SBC content server 320, and SBC subscription engine 350. The SBC control build engine 330 may be timer based (e.g., content may be provided at regular intervals of time), location based (e.g., content may be provided based on device location as determined by, for instance, a global positioning system (GPS) feature of the mobile device), and/or based at least partly on other relevant factors (e.g., content provider preference, subscriber preference, based on calendar information, based on caller information, based on SMS information, etc.). In addition, some embodiments may allow user interaction definition for clicking hotspots in one or more background display areas.

The SBC subscription engine 350 may manage user subscriptions. The subscription engine may include data associated with each subscriber (e.g., username and password, subscribed feeds, update preferences, etc.). In addition, the subscription engine may interface with other components (e.g., composition studio 340, control build engine 330, distribution center 360, etc.) in order to provide appropriate content to subscribers. The SBC subscription management engine 350 may allow subscription management from a web portal and/or mobile device. Such management may include setup of preferences (e.g., screen selection for content updates, from mobile devices) and pausing/resumption of content (e.g., screen selection, from mobile devices or a portal).

The SBC content distribution center 360 may provide content to subscribers. The content may be provided in various appropriate ways. For instance, some embodiments may push the content a user device (e.g., a smartphone). As another example, some embodiments may make the content available through a network and may send a message to each user device that identifies a location of the content.

The user/subscriber actions may be executed based on various relevant factors. For instance, the actions may be timer-based, based on access to an SBC server, based on a query to the SBC server, when a subscription to an SBC is selected, when a screen selection for an SBC is made, when pausing/resuming SBC, when a subscription is cancelled, based on interactions with SBC hotspots, sharing SBC with others, and/or other appropriate factors.

Although the system 300 has been described with reference to various specific details, one of ordinary skill in the art will recognize that the system may be implemented in various different ways without departing from the spirit of the invention. For instance, multiple elements may be combined to form a single element and/or a single element may be divided into multiple sub-elements. As another example, although the system has been described with reference to particular content (e.g., SBC), one of ordinary skill in the art will recognize that other types of content may be used (e.g., slideshows, video content, audio content, etc.).

III. Methods of Operation

Figure 4:
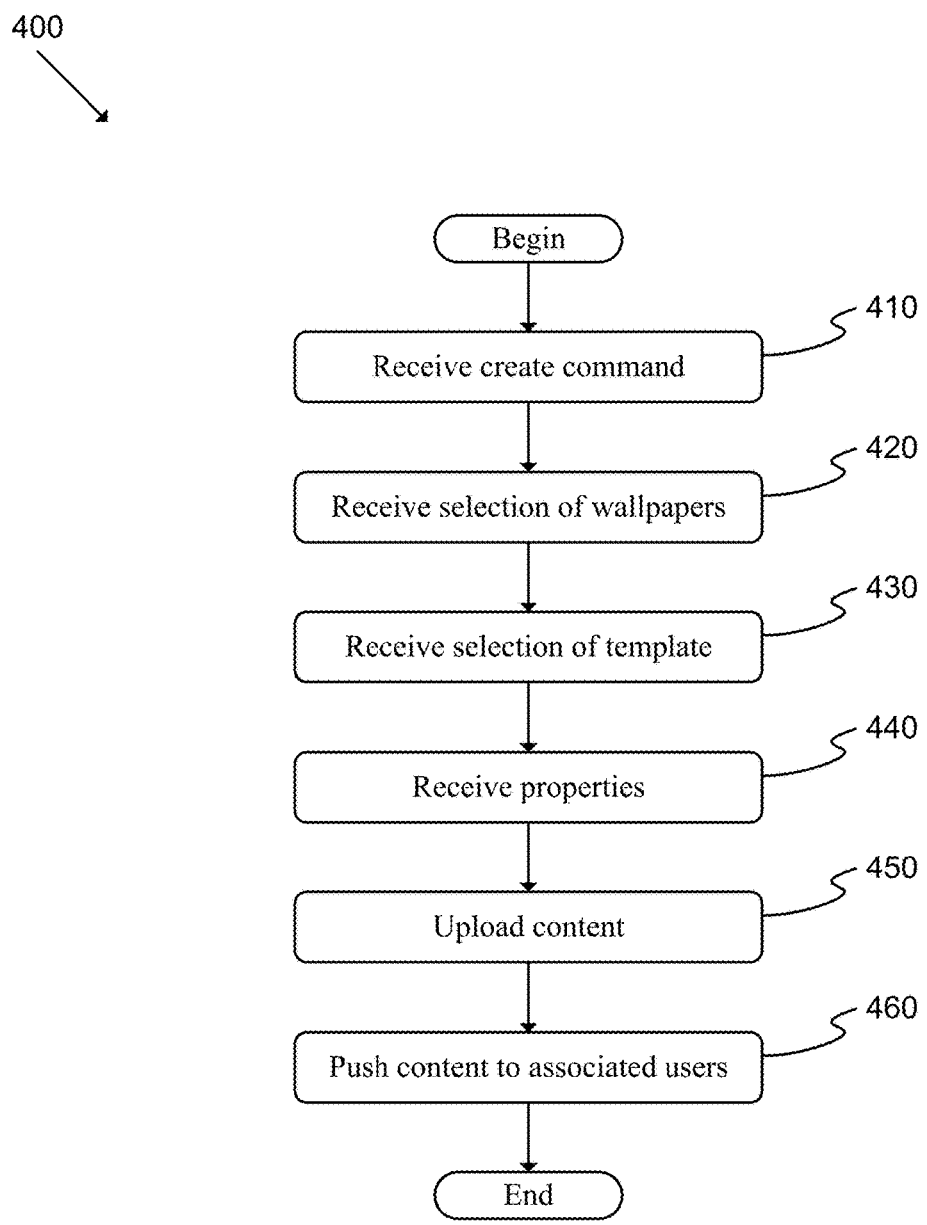
FIG. 4 illustrates a flow chart of a conceptual process used by some embodiments to create multimedia content.

FIG. 4 illustrates a flow chart of a conceptual process 400 used by some embodiments to create multimedia content. Such a process may begin, for instance, when a creator downloads a client application of some embodiments, accesses a web site provided by some embodiments, and/or under other appropriate conditions.

Next, the process may receive (at 410) a create command. Such a command may be received in various appropriate ways. One such example is described below in reference to FIG. 10 below. Process 400 may then receive (at 420) a selection of wallpapers. Such a selection may be made in various appropriate ways. One example selection is described below in reference to FIG. 11 below.

Next, process 400 may receive (at 430) a selection of a template. Such a selection may be received in various appropriate ways. One such example selection is described below in reference to FIG. 11 below, another example selection is described in reference to FIG. 13 below.

The process may then receive (at 440) properties associated with the selected template and/or wallpapers. One example of receiving such properties is described in reference to FIG. 12 below, while another example is described in reference to FIG. 14 below.

Process 400 may then upload (at 450) generated content and push (at 460) the content to subscribers.

In some embodiments, a studio may be used to create content. Wallpapers and templates are then provided for selection. Various properties may then be associated with the content. The content may then be uploaded and pushed to subscribers. Such content may cause a client application running on a subscriber device to update content provided to the subscriber (e.g., wallpaper may be updated). Such content may be pushed at various appropriate times (e.g., at regular intervals, based on subscriber preference, based on provider preference, etc.), under various appropriate conditions (e.g., when a subscriber logs on, when a subscriber satisfies a condition, etc.), and/or otherwise based on various appropriate factors.

In some other embodiments, a distribution portal may provide various predefined templates for selection. Upon selecting a template, a feed creator may fill various properties available in the template, and then with a single click automatically cause a feed to be created. A dashboard control portal may then be used to upload content and push the content to subscribers.

One of ordinary skill in the art will recognize that process 400 is conceptual in nature and may be implemented in various different ways without departing from the spirit of the invention. For instance, the process may be divided into multiple sub-processes or performed as a sub-process of a larger macro process. As another example, various operations may be performed in various orders. In addition, different operations may be included and/or various operations may be omitted.

Figure 5:
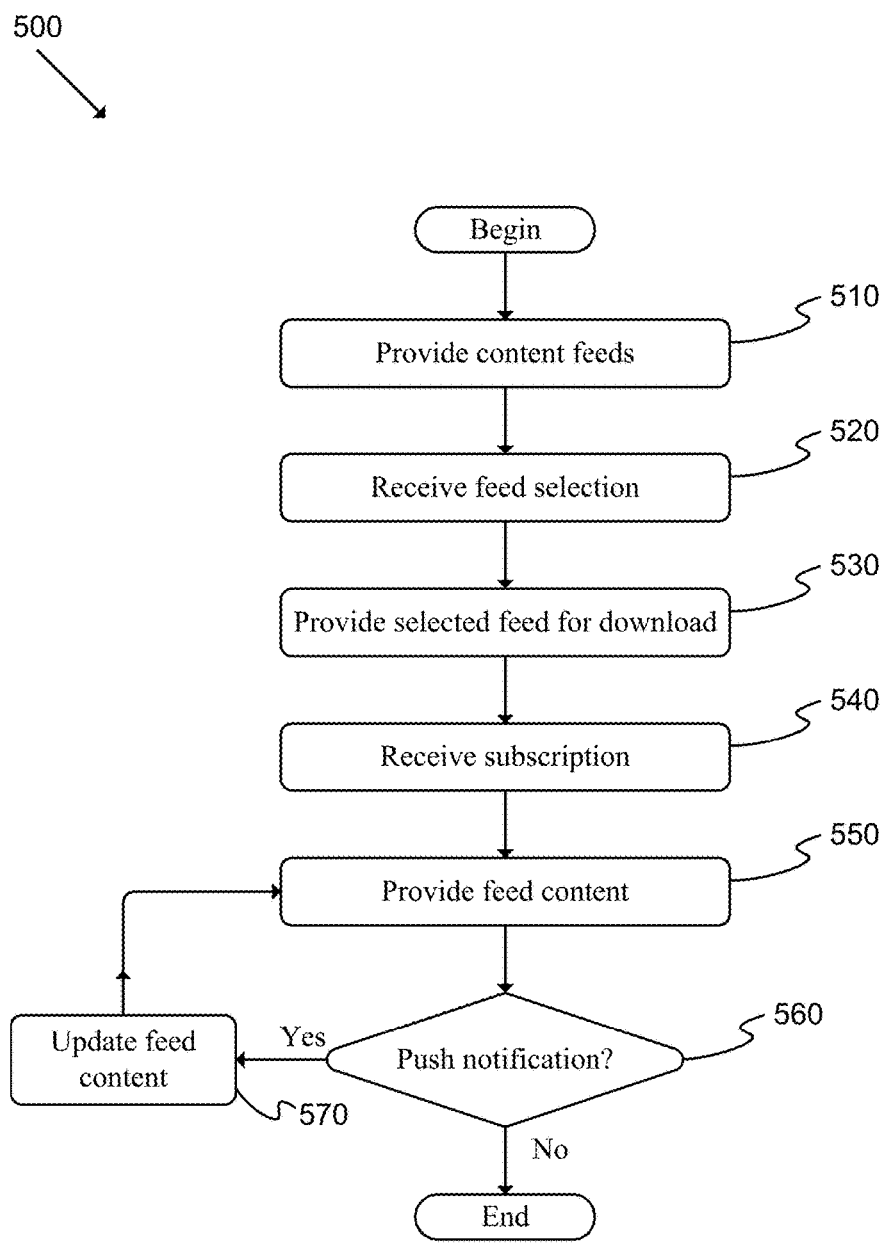
FIG. 5 illustrates a flow chart of a conceptual process used by some embodiments to provide multimedia content to an end user (or subscriber)

FIG. 5 illustrates a flow chart of a conceptual process 500 used by some embodiments to provide multimedia content to an end user (or subscriber). Such a process may begin, for instance, when a user accesses a web site of some embodiments, launches a client installer of some embodiments, and/or under other appropriate conditions.

Next, process 500 may provide (at 510) available content feeds. Such content feeds may be provided in various appropriate ways (e.g., via an alphabetical listing, using a searchable database, etc.). The process may then receive (at 520) a feed selection. Such a selection may be made and received in various appropriate ways (e.g., a user may click a link, may select an element by clicking a box, etc.).

Process 500 may then provide (at 530) the selected feed(s) for download. The process may then receive (at 530) a subscription. Such a subscription may be received automatically when the downloaded feed is installed on a user device.

Next, the process may provide (at 550) feed content to the user device. Such feed content may be provided in various appropriate ways (e.g., by pushing the content to the user device, by sending a message to the user device indicating a location where the content is accessible, etc.).

Process 500 may then determine (at 560) whether a push notification has been received (and/or whether any other criteria has been met, such as an update interval, a content refresh request received from a user, etc.). When the process determines (at 560) that a push notification has been received, the process may update (at 570) feed content (e.g., by receiving the updated content from a server) and then provide (at 550) the updated content to the user device. When the process determines (at 560) that no push notification has been received, the process may end (or repeatedly determine whether a push notification has been received). Operations 550-570 may be performed continuously, at regular intervals, based on a received command, based on user preference, and/or at other appropriate times (e.g., when a user launches an client application of some embodiments).

Process 500 may be implemented using a portal and/or a mobile installer application. From a portal, various available content feeds may be provided for browsing and selection. Next, a selection may be downloaded and installed. After installation, the selected content feed will automatically be subscribed to and made available for any content push. From a mobile installer application, various feeds may be provided for browsing and selection and a selection may be downloaded and installed. An installed selection may then automatically subscribe to the feed and become available for a content push.

One of ordinary skill in the art will recognize that process 500 is conceptual in nature and may be implemented in various different ways without departing from the spirit of the invention. For instance, the process may be divided into multiple sub-processes or performed as a sub-process of a larger macro process. As another example, various operations may be performed in various orders. In addition, different operations may be included and/or various operations may be omitted.

IV. Exemplary Implementations

FIGS. 6-26 illustrate various conceptual UIs and/or GUIs 600-2600 that may be provided by some embodiments. Such UIs may include various elements that may allow a user to generate and/or distribute multimedia content. The UIs may be displayed using, for instance, a display element (e.g., a touch screen) associated with a user device. Likewise, the UIs may receive user inputs from various elements (e.g., a touch screen, a keypad, etc.) associated with a user device. The functionality described in reference to FIGS. 6-26 may be implemented in various appropriate ways.

One of ordinary skill in the art will recognize that the UIs 600-2600 are provided for example purposes only and that some embodiments may be implemented in various other ways without departing from the spirit of the invention. For instance, different embodiments may include elements that vary from the examples shown in various ways (e.g., different embodiments may include elements of differing size, shape, placement, arrangement, etc. than those shown). In addition, various specific elements may be labeled and/or presented in various different ways in different embodiments. As another example, UIs or GUIs may be optimized for display (e.g., based on size of display, available or selected resolution, bandwidth, etc.). Each specific UI or GUI may include various different elements than those shown (e.g., additional elements, fewer elements, a sub-set of elements, a super-set of elements, etc.).

In addition, different embodiments may provide various UIs in different appropriate ways. For instance, some UIs or GUIs may be provided using a downloadable smartphone app (or other appropriate downloadable application) while other UIs or GUIs may be provided through a web site or other appropriate web-based interface.

Figure 6:
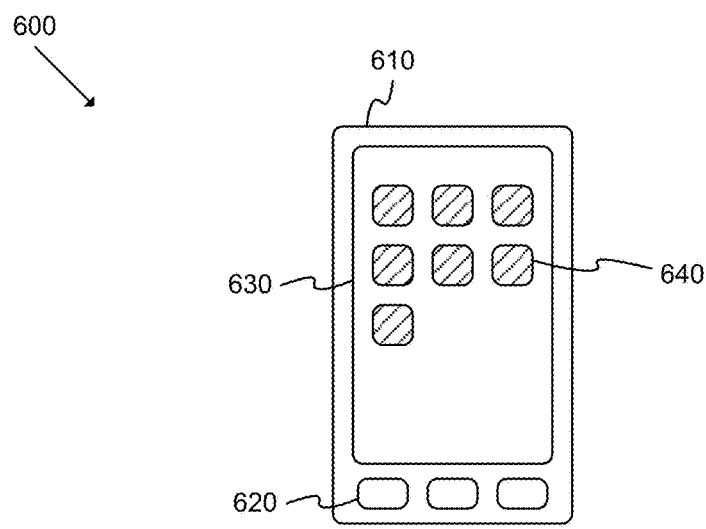
FIG. 6 illustrates an example user interface (UI) provided by a user device.

FIG. 6 illustrates an example user interface (UI) 600 provided by a user device 610. As shown, the device may include various control elements 620 (e.g., buttons, knobs, switches, etc.), a display element 630 (which may also allow capture of user inputs, i.e., a touch screen device), and various icons 640 or other display elements that may be associated with various applications, functions, services, etc. of the user device 610. Such a user interface 600 is presented for example purposes only, and various devices may include various different controls, display elements, etc.

Figure 7:
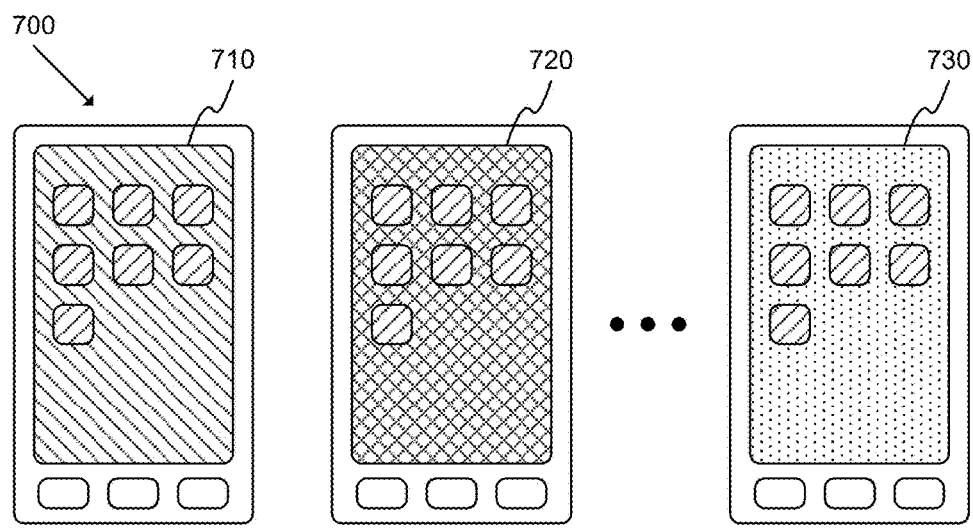
FIG. 7 illustrates an example UI with wallpaper elements of a user device (e.g., a smartphone) changing over time, based on creator preference (and/or other relevant factors), without altering any other functionality of the user device.

FIG. 7 illustrates an example UI 700 with wallpaper elements 710-730 of a user device (e.g., a smartphone) changing over time, based on creator preference (and/or other relevant factors), without altering any other functionality of the user device. As shown, the wallpaper may change from a first image 710, to a second image 720, to a third image 730 without affecting the icons 640 and/or other aspects of the device performance. One of ordinary skill in the art will recognize that various content elements may be cycled in various orders, at various times, and/or based on other appropriate criteria.

Figure 8:
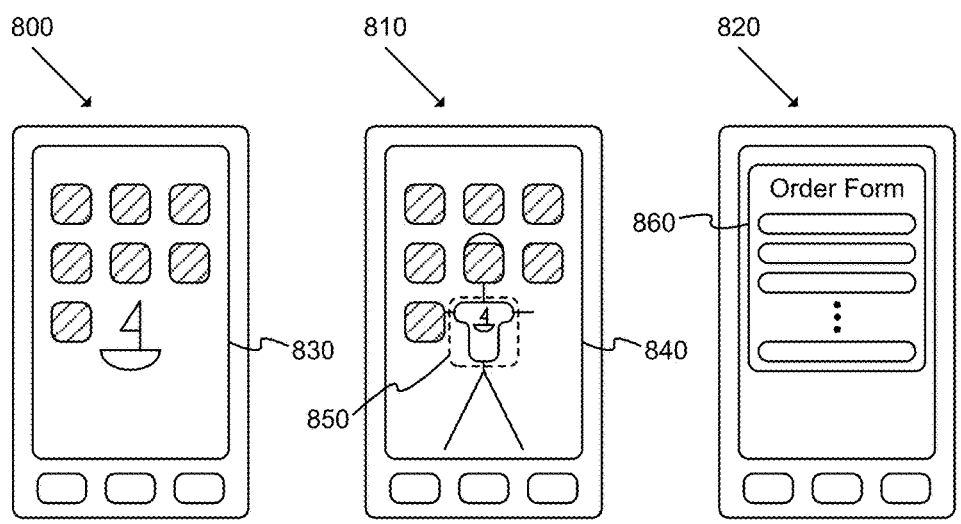
FIG. 8 illustrates various UIs showing the use of "clickable" content that may allow a subscriber to select (e.g., by pressing a touch screen) the clickable content to select various items for sale.

FIG. 8 illustrates various UIs 800-820 showing the use of "clickable" content that may allow a subscriber to select (e.g., by pressing a touch screen) the clickable content to select various items for sale (e.g., by directing the subscriber to an e-commerce site). In this example, a first UI 800 includes a display area 830 displaying a wallpaper image associated with a creator.

The second UI 810 includes a wallpaper image 840 of a model wearing a T-shirt bearing the image from UI 800. The UI 810 includes a clickable area 850 defined around the T-shirt. Such a clickable area may be defined in various appropriate ways (e.g., a user may select an area of an image and assign various properties to that area, an application may automatically detect various elements present in an image and allow a user to define various properties associated with the elements, etc.).

The third UI 820 includes an order form 860 that may be invoked when a user clicks (or otherwise selects) a clickable area of an image (e.g., area 850). Such an order form may allow a user to specify information associated with a product (e.g., size, color, etc.), select shipping alternatives, provide special instructions, etc. In some embodiments, the order form may be provided by a third-party (e.g., a product vendor) and/or the user may be directed to a third-party application or website upon making a selection of a clickable area of an image.

One of ordinary skill in the art will recognize that although the UIs of FIG. 8 have been described with reference to particular features and details, different embodiments may implement the UIs in various different ways without departing from the spirit of the invention. For instance, some embodiments may include multiple clickable areas within a single image. As another example, the entire image may be defined as a clickable area such that a selection anywhere within the wallpaper image (that is not associated with an application icon) may invoke an ecommerce interaction (and/or other appropriate interaction, such as initiating a phone call, web conference, etc.).

Figure 9:
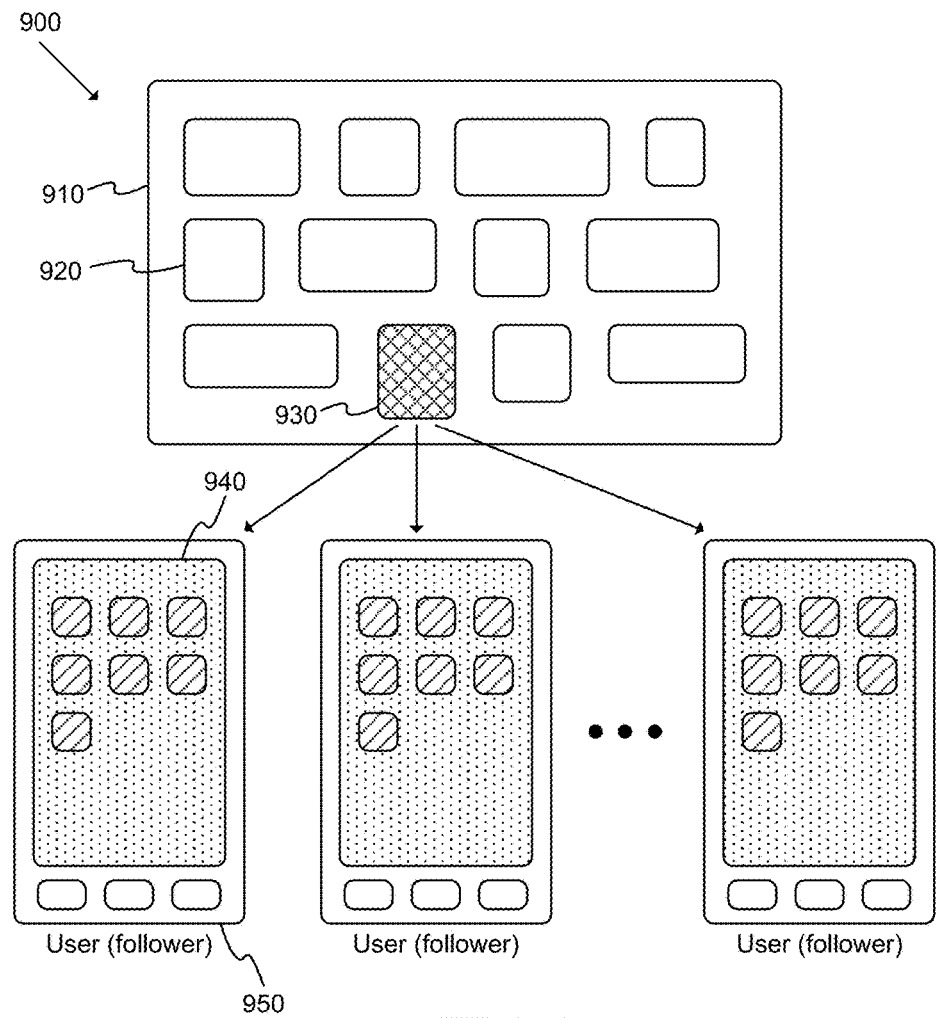
FIG. 9 illustrates a content provider GUI that may allow a creator to select content to be presented to subscribers.

FIG. 9 illustrates a content provider GUI 900 that may allow a creator to select content to be presented to subscribers. Such content may be provided instantly (i.e., upon selection by the creator) in some embodiments.

As shown, the GUI 900 may include a display field 910 that includes multiple selectable icons 920 (and/or other selectable elements such as the elements of a list), where one particular icon 930 is indicated as selected by a difference in shading (such selection may be indicated in various appropriate ways such as a change of size, color, formatting, etc.). The selected icon may be distributed to serve as the wallpaper 940 of various user devices 950, as appropriate. Such user devices may be associated with subscribers (or followers) of a creator. The wallpaper 940 may be modified as necessary to display the content associated with the selected icon 930. Such content may include various multimedia elements, clickable regions, etc.

One of ordinary skill in the art will recognize that various different interfaces may be provided to allow a creator to select from among a set of available content items. In addition, the available content items may be determined and/or displayed in various appropriate ways (e.g., based on an evaluation of database elements, based on the types of content items available, etc.).

Figure 10:
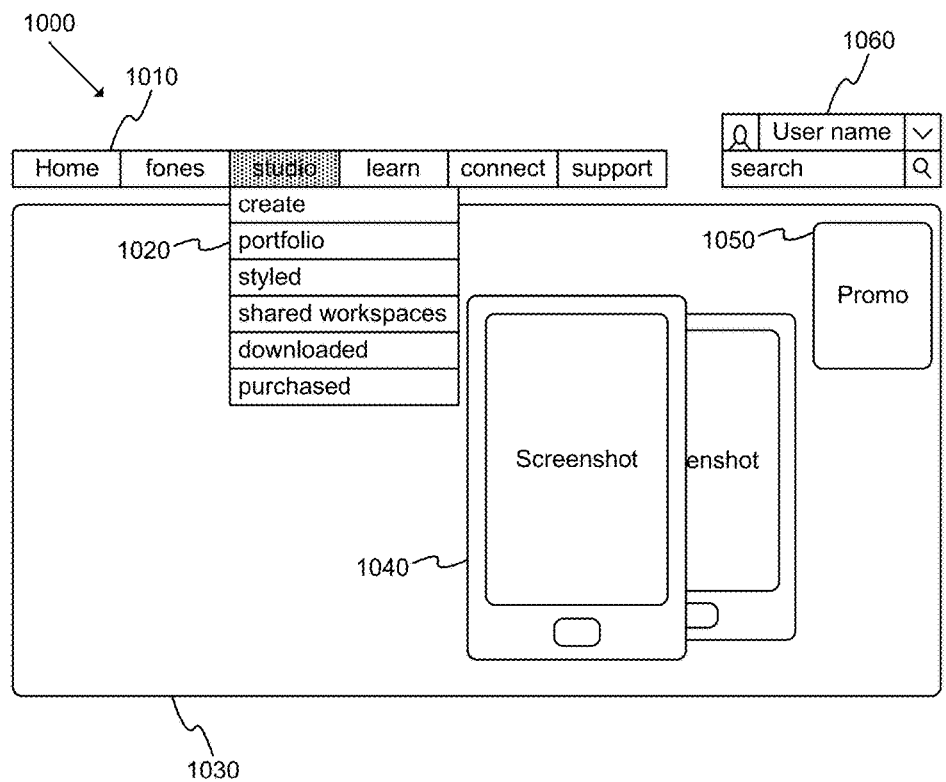
FIG. 10 illustrates a studio GUI that may be used by a creator to generate content.

FIG. 10 illustrates a studio GUI 1000 that may be used by a creator to generate content. Such an interface may be provided by an element such as the composition studio 440 described above.

As shown, the GUI 1000 may include one or more menu bars 1010 (such menu bars as described above and/or below may be used alternatively and/or conjunctively to and/or with various other elements such as pop-up menus, drop-down menus, selectable elements or regions, and/or other appropriate GUI elements), various drop-down and/or pop-up menus including various elements 1020, a palette 1030 or other display area, one or more rendered screenshots 1040 (which may be selected by a user to initiate navigation to a particular template, content item, and/or other resource), a promotional display area 1050, and/or other elements 1060 (e.g., a user login display, a search box, etc.). Any or all elements of the GUI 1000 may be selectable. Various other elements may also be included in some embodiments (e.g., advertisements, "share" buttons, social network features, demos, etc.).

Figure 11:
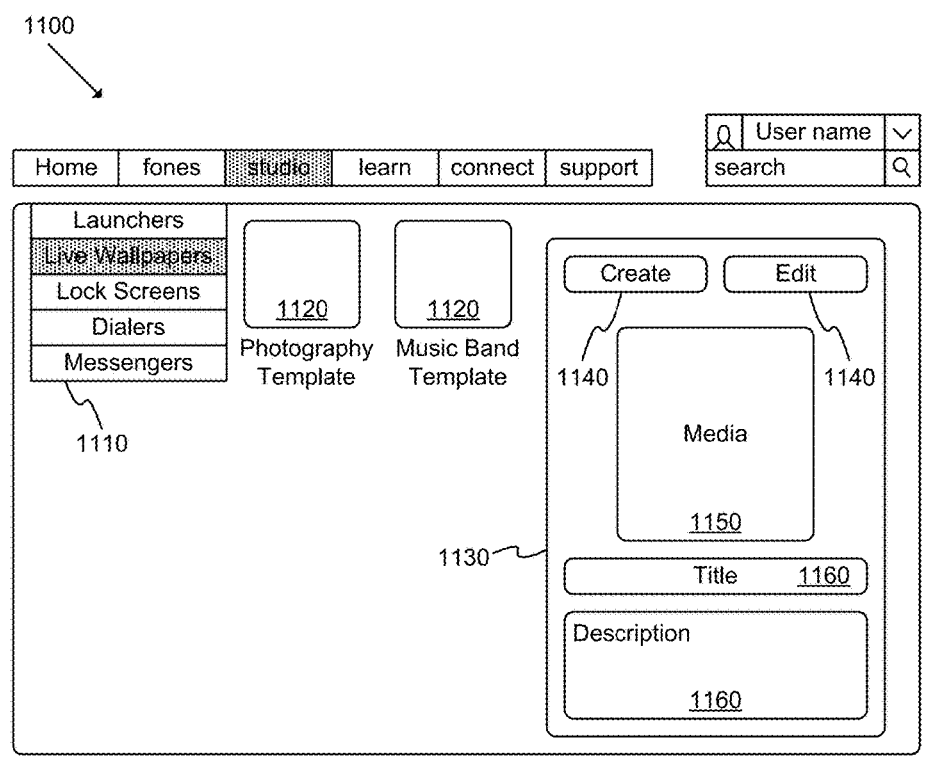
FIG. 11 illustrates a studio GUI that may allow a provider to select various wallpaper and content elements.

FIG. 11 illustrates a studio GUI 1100 that may allow a provider to select various wallpaper and content elements. As shown, a user may be presented with a list of selections 1110, various templates 1120, and a generation form 1130 that may include one or more selectable elements 1140 (e.g., buttons, checkboxes, etc.), thumbnail display areas 1150, and/or content fields 1160.

Figure 12:
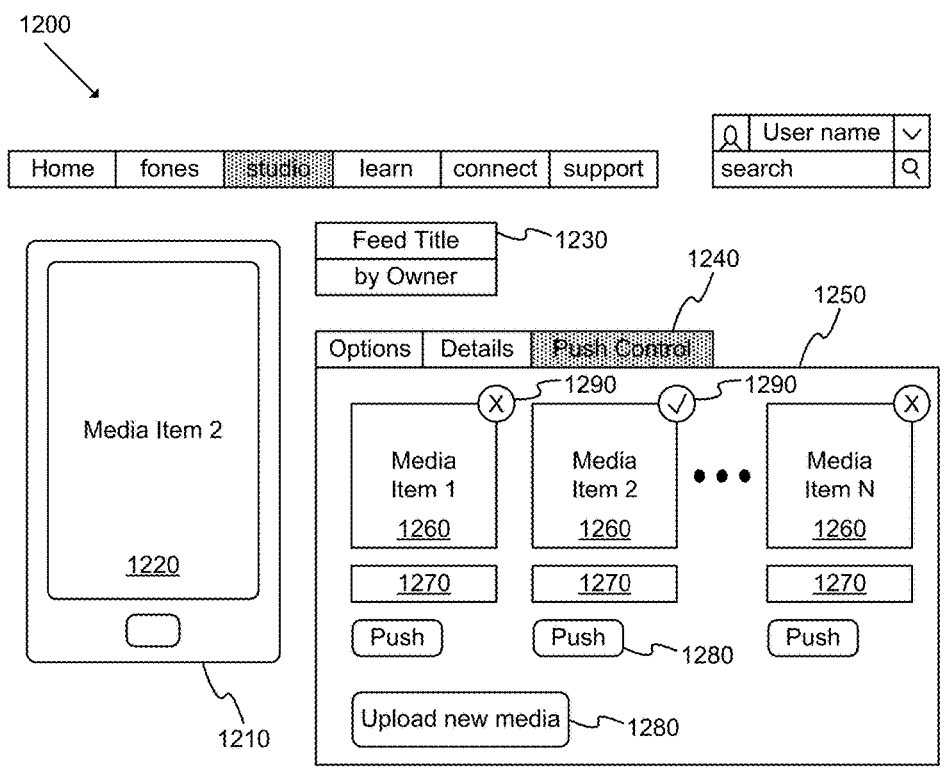
FIG. 12 illustrates a studio GUI that may allow a creator to select and set various properties for the content.

FIG. 12 illustrates a studio GUI 1200 that may allow a creator to select and set various properties for the content. As shown, the GUI may include a rendered screenshot 1210 that displays the currently selected content 1220, various attributes of the feed 1230 (e.g., title, creator name or username, etc.), a set of selectable tabs 1240 associated with various types of information a user may be able to associate with content. In addition, the GUI 1200 may include a gallery 1250 where various content items 1260 and associated information 1270 (e.g., comments regarding media in the gallery, information or notes, etc.) may be displayed as well as one or more action elements 1280 (e.g., clickable buttons), and indicators 1290 that may show which media item (or items) have been selected for distribution.

A creator may able to interact with GUIs 1000-1200 to supply content as described above in reference to process 400. Various other appropriate interactions may also be allowed by GUIs such as those described above.

Figure 13:
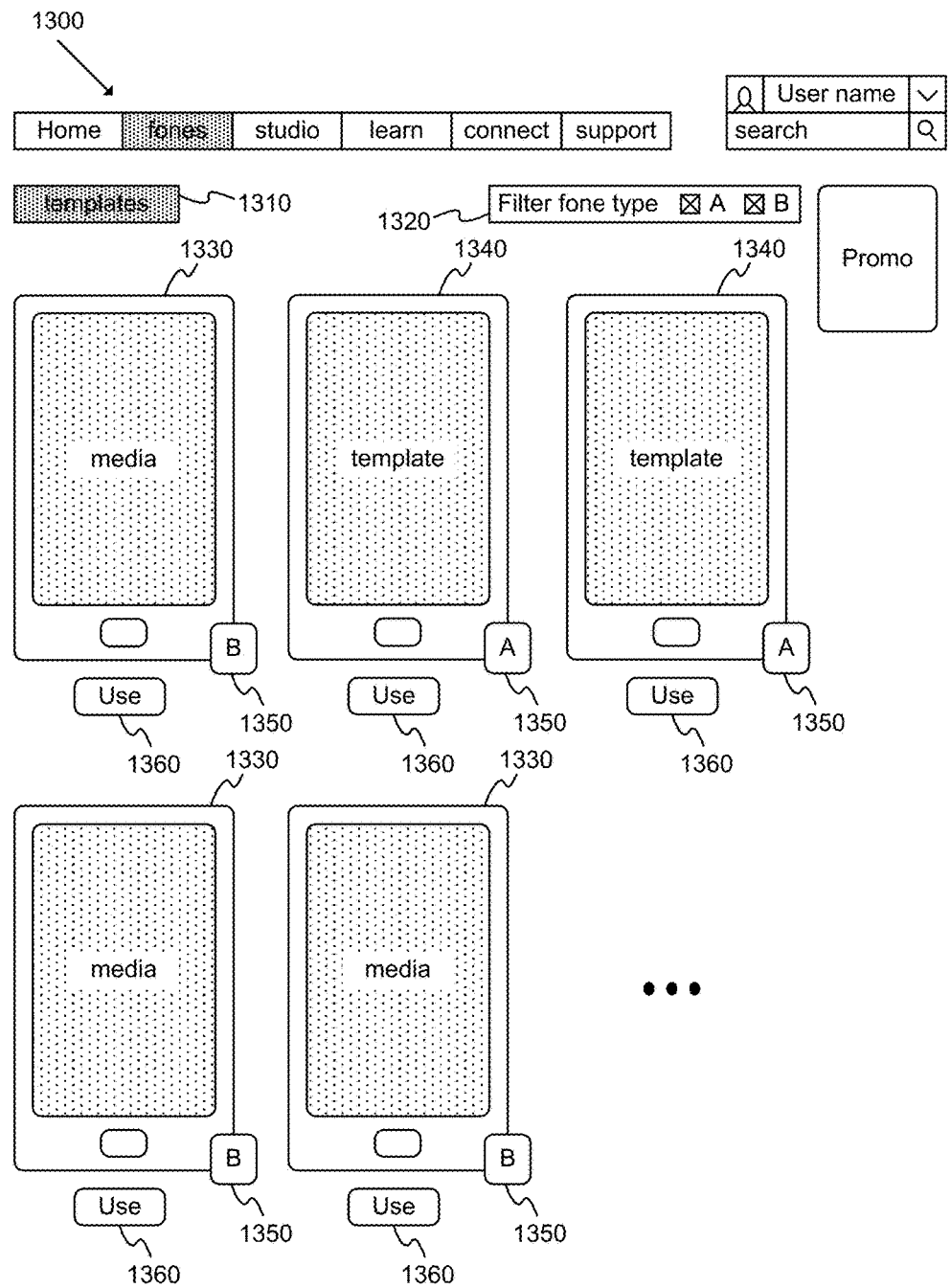
FIG. 13 illustrates a portal GUI that may be used by a provider to select a predefined content template.

FIG. 13 illustrates a portal GUI 1300 that may be used by a provider to select a predefined content template. As shown, the GUI may include one or more tabs or labels 1310, a set of selectable filter elements 1320, and a gallery of media elements 1330 and/or templates 1340.

Each media element 1330 and/or each template 1340 may include a "badge" 1350 and/or be associated with an action element 1360. The badge 1350 may indicate whether an element is, for instance, a live wallpaper element (e.g., a picture) or a "launcher" element (e.g., a link to another element such as a template). Such templates may include various types appropriate for various types of creators (e.g., a photography template, a music performer template, etc.).

Figure 14:
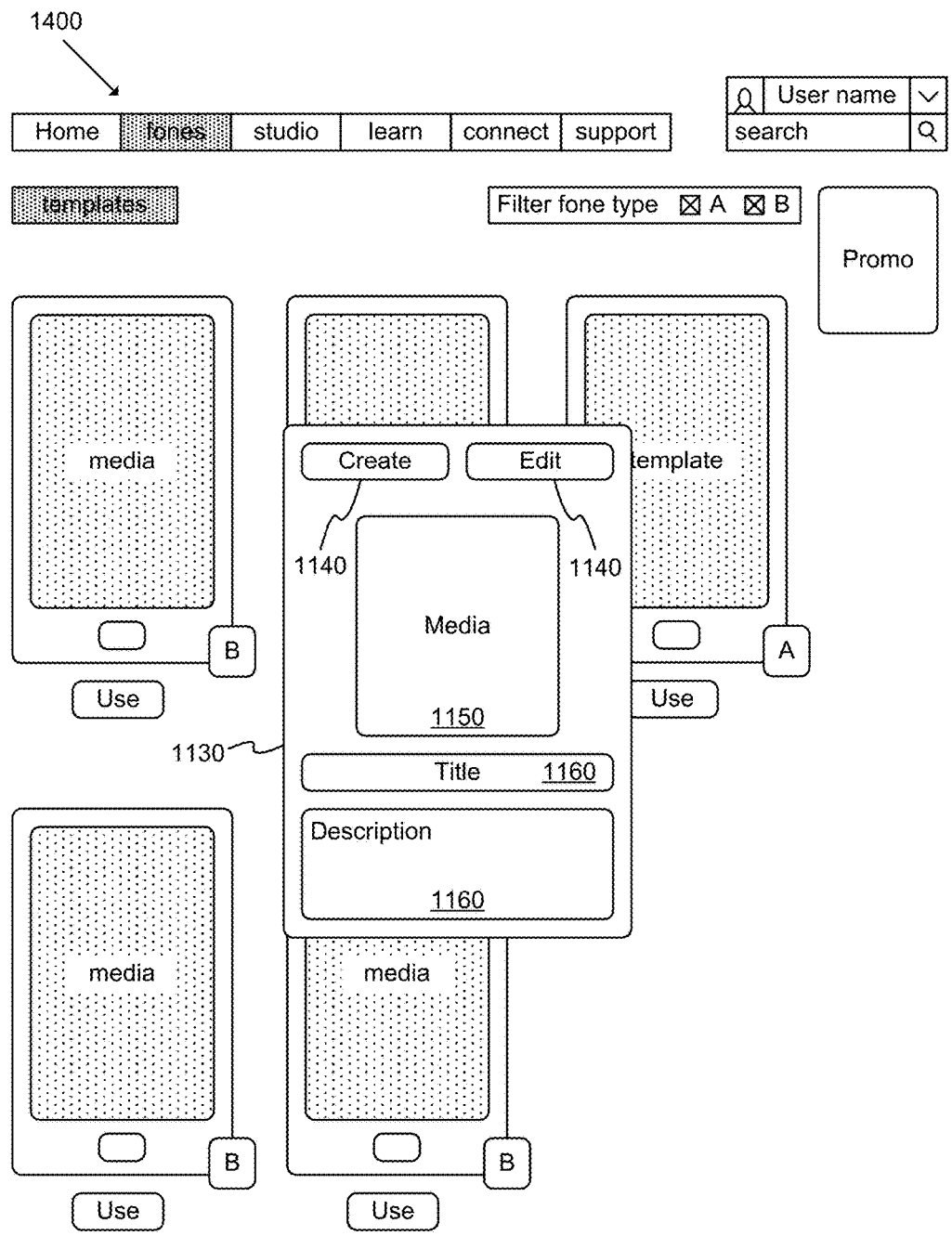
FIG. 14 illustrates a portal GUI that may allow a provider to select and set various properties for the predefined content template elements.

FIG. 14 illustrates a portal GUI 1400 that may allow a provider to select and set various properties for the predefined content template elements. Such a GUI 1400 may be invoked, for instance, after a user has selected a template using action element 1360 described above. As shown, the GUI 1400 may include a generation form 1130 that may include one or more selectable elements 1140 (e.g., buttons, checkboxes, etc.), thumbnail display areas 1150, and/or content fields 1160 as described above in reference to FIG. 11.

A creator may able to interact with GUIs 1300-1400 to supply content as described above in reference to process 400. Various other appropriate interactions may also be allowed by GUIs such as those described above.

Figure 15:
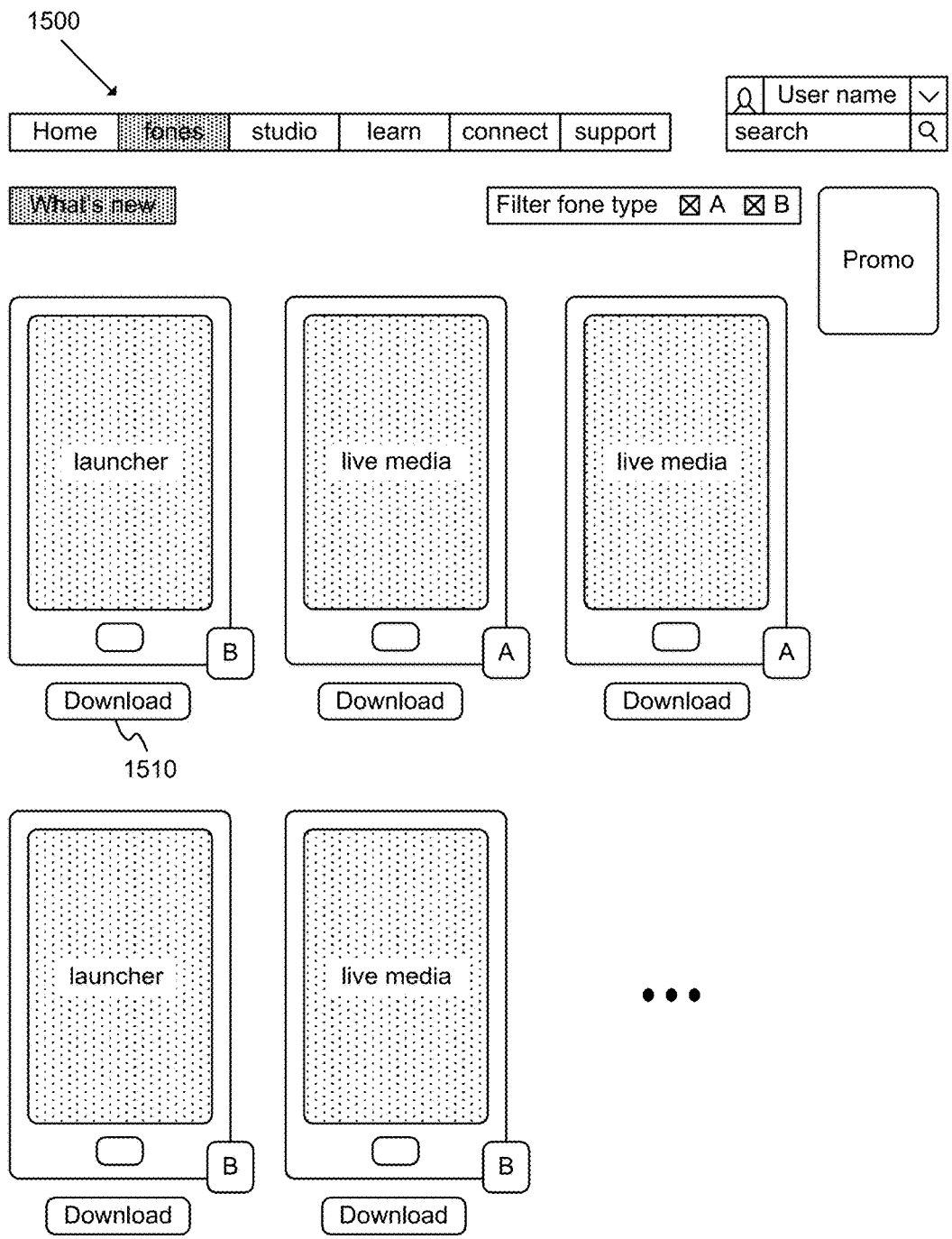
FIG. 15 illustrates a portal GUI that may allow a subscriber to select a content subscription.

FIG. 15 illustrates a portal GUI 1500 that may allow a subscriber to select a content subscription. As shown, the GUI may include a gallery of launchers 1330 and/or live media elements 1340, each associated with a selectable action item 1510 that may allow a user to download the associated item. In some embodiments, a subscriber may be able to select among launchers, wallpapers, lock screens, address books, etc.

In some embodiments, a subscriber may discover, download, and install a launcher or other appropriate element using a GUI such as GUI 1500. In addition, a similar GUI may be used to select various feeds after installation.

A subscriber may able to interact with GUI 1500 to evaluate and/or select content as described above in reference to process 500. Various other appropriate interactions may also be allowed by GUIs such as that described above.

Figure 16:
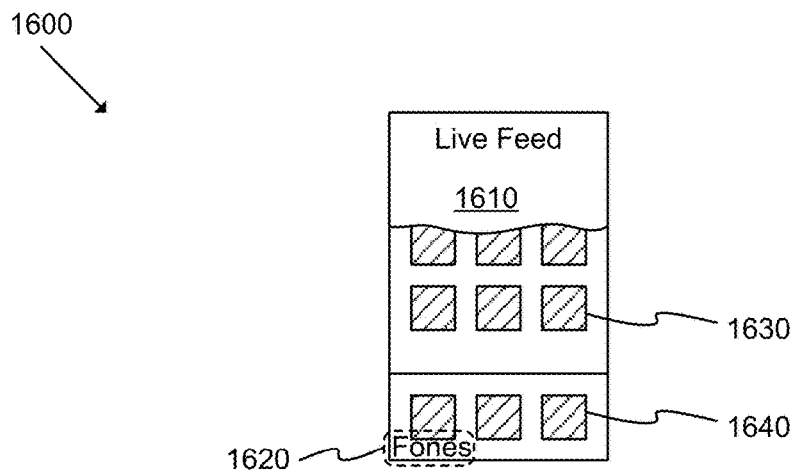
FIG. 16 illustrates a subscriber GUI that may allow a potential subscriber to select among various live feeds and/or "fones"

FIG. 16 illustrates a subscriber GUI 1600 that may allow a potential subscriber to select among various live feeds and/or "fones" (e.g., launchers, wallpapers, lock screens, address books, etc.). Such a GUI may be presented to users as a landing screen when a mobile device app is launched, for instance. As shown, the GUI 1600 may include a live feed selection area 1610, a fone selection area 1620, various application icons 1630 in a first area, and/or various application icons 1640 in a second area.

Figure 17:
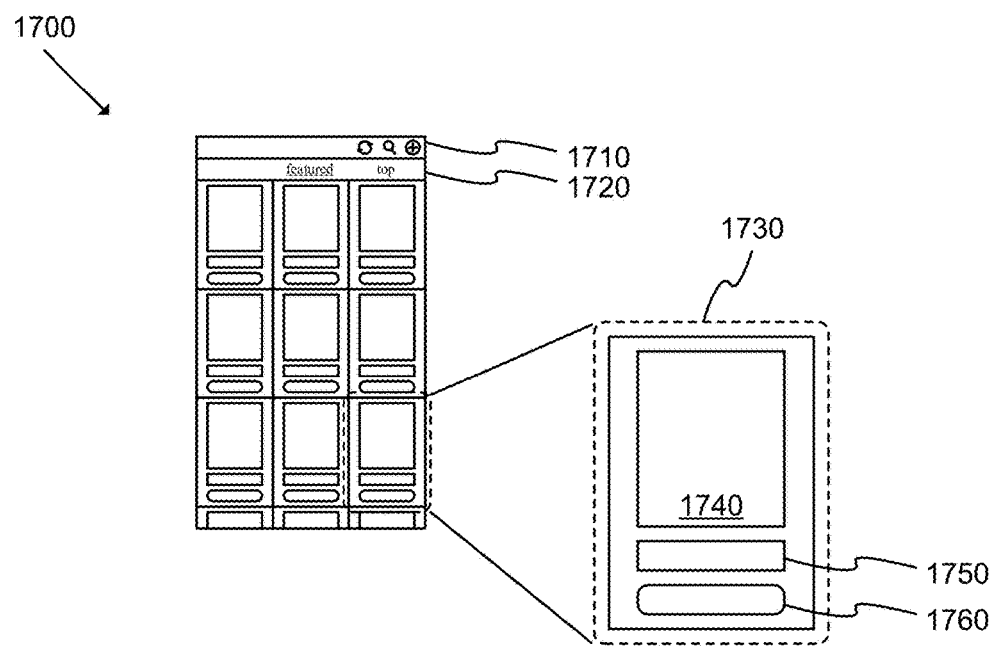
FIG. 17 illustrates a subscriber GUI that may allow a user to browse among various feeds and/or fones that may be available.

FIG. 17 illustrates a subscriber GUI 1700 that may allow a user to browse among various feeds and/or fones that may be available. Such a GUI may be invoked, for instance, when a user selects either the live feed 1610 or fone area 1620 of GUI 1600. As shown, GUI 1700 may include a set of selectable elements 1710 (e.g., refresh, search, add, etc.), a set of selectable display tabs 1720 (e.g., featured, top, shared, owned, subscriptions, etc.), and a set of tiled elements 1730, each tiled element including a media display area 1740, a title or description area 1750, and an action element 1770 (e.g., download, subscribe, etc.). In some embodiments, the action element 1770 may include a purchase price, as appropriate.

FIG. 18 illustrates example feed GUIs 1810-1820 provided by some embodiments. GUI 1810 may be invoked, for example, after a user has installed an application of some embodiments and selected some live wallpaper for display.

As shown, the GUI may include a background 1830 (e.g., live content provided as wallpaper), various application displays or elements 1840 (e.g., a clock, calendar, weather forecast, etc.), various action elements 1850 that may be associated with a mobile device application of some embodiments (e.g., setup, refresh, etc.), and/or various other action items 1860 (e.g., icons representing various user device functions, such as phone, contacts, email, etc.).

GUI 1820 may be invoked, for instance, when a user locks a mobile device. The GUI may be displayed as a lock screen, when a mobile device is powered on or unlocked, and/or under other appropriate conditions. As shown, the GUI may include a background 1870 (which may be the same or a different background than background 1830) and one or more hotspots 1880. Such a hotspot may be used to activate a mobile device application of some embodiments or to interact with various system elements, as appropriate.

FIG. 19 illustrates a subscriber GUI 1900 that may allow a user to define various preferences associated with operation of a mobile device application of some embodiments. Such a GUI may be invoked, for instance, when a user selects a hotspot of some embodiments (e.g., hotspot 1880). As shown, GUI 1900 may include a set of selectable elements 1910 (e.g., search, add, etc.), a list of selectable options 1920, and/or one or more web links 1930.

FIG. 20 illustrates a subscriber GUI 2000 that may allow a user to define a location of a hotspot (e.g., hotspot 1880). Such a GUI may be invoked, for instance, when a user selects an option such as "hotspot location" from the list of selectable options 1920. As shown, the subscriber may be able to move the hotspot from a first location 2010 to a second location 2020 by selecting and dragging the hotspot along path 2030.

Figure 21:
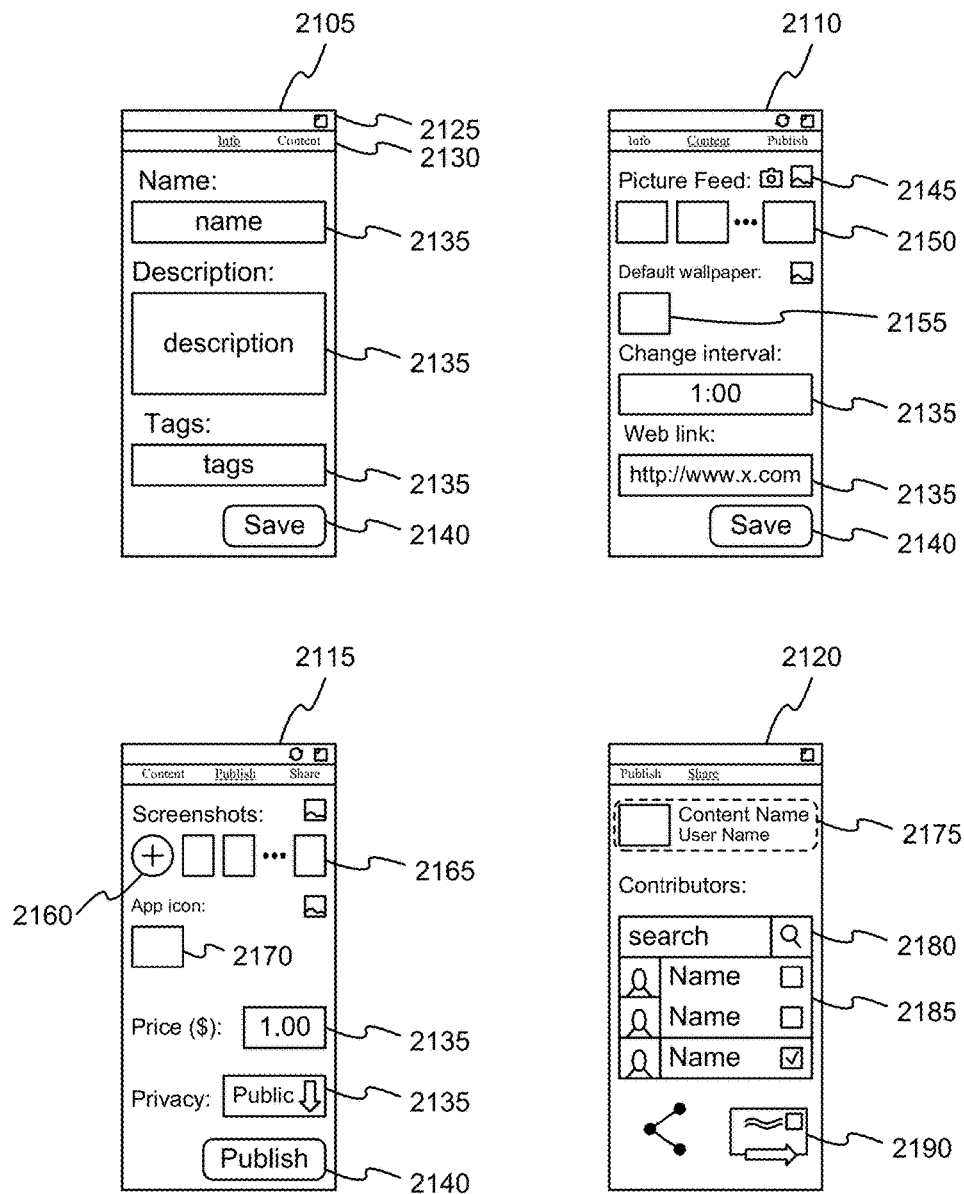
FIG. 21 illustrates various creator GUIs that may be used to create and share a feed of some embodiments.

FIG. 21 illustrates various creator GUIs 2105-2120 that may be used to create and share a feed of some embodiments. GUI 2105 may be invoked, for instance, when a user makes a selection in a mobile device app of some embodiments, when a user accesses a web site, and/or under other appropriate conditions. As shown, the GUI may include a set of selectable items 2125 (e.g., save, new, etc.), a set of selectable tabs 2130 (e.g., info, content, publish, share, etc.), various information fields 2135 (e.g., name, description, tags, etc.), and one or more selectable elements 2140 (e.g., save).

GUI 2110 may be invoked, for instance, when a user selects a content element from the set of tabs 2130, when a user selects element 2140 in GUI 2105, and/or under other appropriate conditions. As shown, GUI 2110 may include a picture feed with various selectable elements 2145 (e.g., gallery, camera, etc.) a set of media items 2150 (which may be represented as icons, thumbnails, etc.), a default selection 2155 from among the media items 2150, various information fields 2135 (e.g., change interval, web link, etc.), and/or one or more selectable elements 2140.

GUI 2115 may be invoked, for instance, when a user selects a publish element from the set of tabs 2130, when a user selects element 2140 in GUI 2110, and/or under other appropriate conditions. As shown, GUI 2115 may include an add media element 2160, a gallery of screenshots 2165, and a selected application icon 2170. In addition, various information fields 2135 (e.g., price, privacy, etc.) and/or selectable elements 2140 may be provided.

GUI 2120 may be invoked, for instance, when a user selects a share element from the set of tabs 2130, when a user selects element 2140 in GUI 2115, and/or under other appropriate conditions. As shown, GUI 2120 may include a feed identification field 2175, a search element 2180, a listing of available contacts or users 2185, and one or more action elements 2190 (e.g., email, social network link, etc.). The feed identification field 2175 may include an icon, a title of the feed, the creator of the feed, etc. The contacts or users 2185 may be selected as contributors (e.g., the selected users may have privileges to modify the content of the feed by, for instance, adding media items, modifying properties of media items, etc.).

Figure 22:
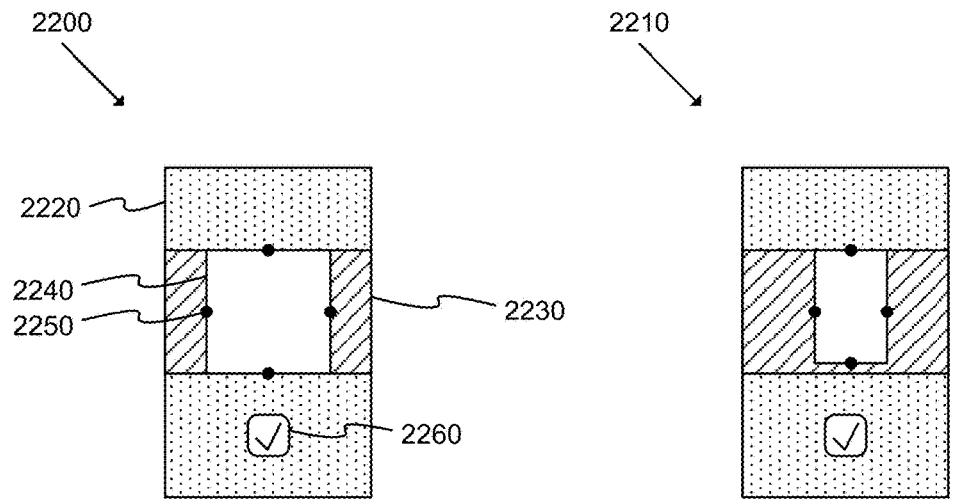
FIG. 22 illustrates media editing GUIs that may be provided by some embodiments to allow a user to define display properties of a media item.

FIG. 22 illustrates media editing GUIs 2200-2210 that may be provided by some embodiments to allow a user to define display properties of a media item. Such GUIs may be invoked, for instance, when a user selects a media item, when a user uploads a media item, and/or under other appropriate conditions. As shown, GUI 2200 may include a background area 2220, a media item 2230 (e.g., an image), a selected display area 2240 (which is indicated by a rectangle in this example), a set of movable elements 2250 associated with each side of the display area 2240, and an action element 2260. In the example of GUI 2200, a user may position the elements 2240 to select a region of the media item 2230 for display as wallpaper. In the example of GUI 2210, a user may position the elements 2240 to select a region of the media item 2230 for display as part of an image slideshow.

Figure 23:
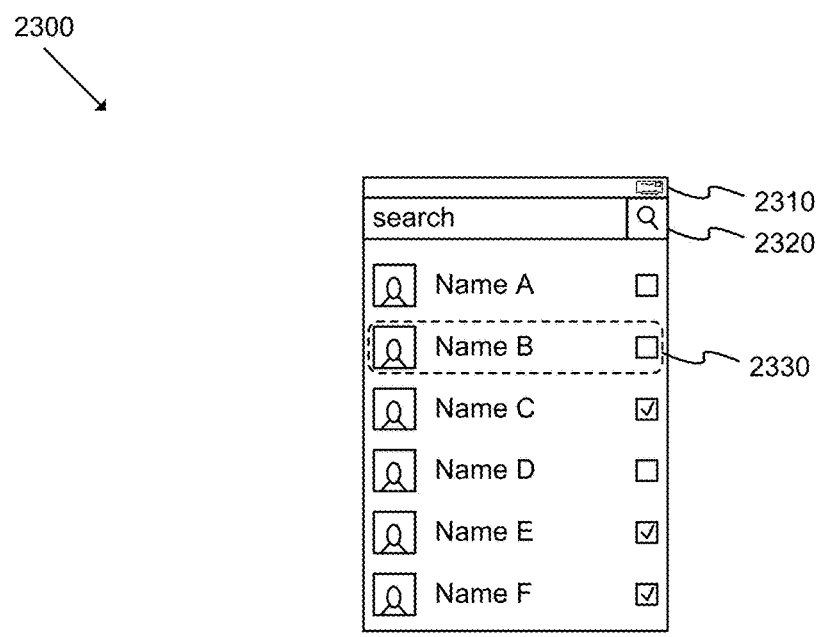
FIG. 23 illustrates an email invitation GUI used by some embodiments.

FIG. 23 illustrates an email invitation GUI 2300 used by some embodiments. Such an email invitation may be invoked, for instance, when a user selections action element 2190 described above in reference to GUI 2120. As shown, GUI 2300 may include a set of selectable elements 2310 (e.g., email invitations), a search (or filter) box 2330, and a listing of contacts 2340 where each contact may include profile information (e.g., image, name, email, etc.) and/or various other elements (e.g., a checkbox that may be used to select the contacts with whom to share the feed). When a user initiates email notification to the selected contacts (e.g., by selecting an element 2310 after checking various contacts 2340), some embodiments may automatically generate notification emails that may include an invitation to access the shared content, various links (e.g., a link to download a mobile device app of some embodiments), etc.

Figure 24:
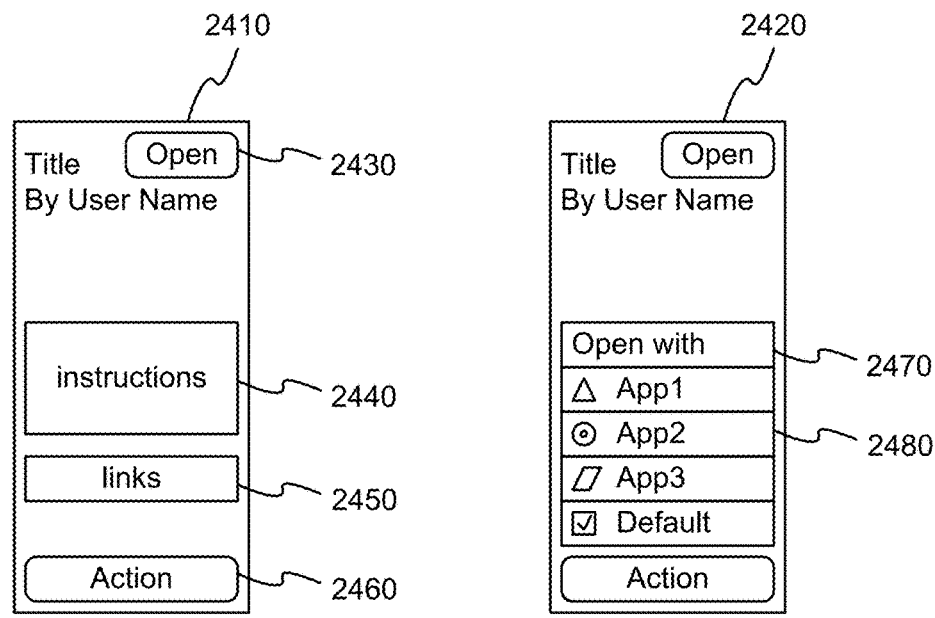
FIG. 24 illustrates example GUIs that may be provided by some embodiments when a feed or fone is accessed using a browser.

FIG. 24 illustrates example GUIs 2410-2420 that may be provided by some embodiments when a feed or fone is accessed using a browser. GUI 2410 may be invoked, for instance, when a user selects a link in an invitation email, when a user selects a feed from a gallery, and/or under other appropriate conditions. The GUI may include an action item 2430 (e.g., open), instructions 2440 (e.g., instructing the user to download and install a mobile device app of some embodiments in order to access the content), various links 2450, and/or other action elements 2460 (e.g., slide to unlock).

GUI 2420 may be invoked, for instance, when a user has previously installed a mobile device application of some embodiments, and selects a feed through the application, responds to an invitation through the application, and/or by accessing a web site provided by some embodiments. As shown, GUI 2420 may include a listing 2470 of selectable elements 2480 that may allow a user to determine how to open a feed or fone (e.g., using an internet browser or other third-party application, using the mobile device application of some embodiments, etc.).

Figure 25:
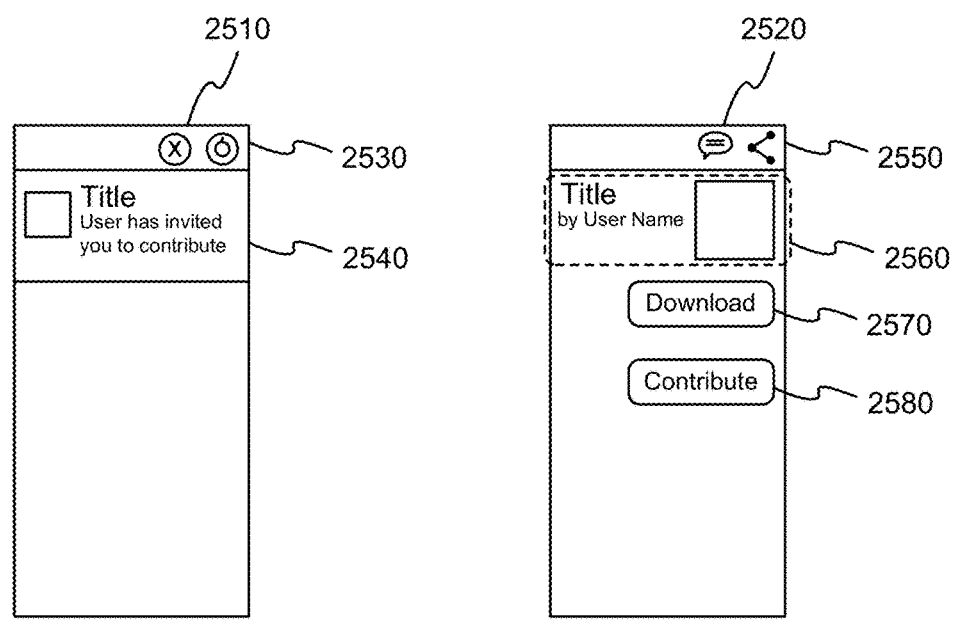
FIG. 25 illustrates notification GUIs that may be used by some embodiments to notify a user that content has been shared and to allow the user to download, subscribe to, contribute to, and/or otherwise interact with the shared content.

FIG. 25 illustrates notification GUIs 2510-2520 that may be used by some embodiments to notify a user that content has been shared and to allow the user to download, subscribe to, contribute to, and/or otherwise interact with the shared content. Notification GUI 2510 may be invoked, for instance, when a recipient clicks a link in an invitation email. As shown, notification GUI 2510 may include a set of selectable elements 2530 (e.g., open/accept, delete/decline, etc.) and an information field 2540 including, for instance, a title and a notification that a particular user has invited the recipient to share or contribute to the content.

GUI 2520 may be invoked, for instance, when a recipient selects one of selectable elements 2530 (e.g., open/accept). As shown, GUI 2520 may include a set of selectable items 2550 (e.g., view information associated with content, select a social network, etc.), an information field 2560 (including, e.g., a feed title, creator name, etc.), a download action element 2570, and/or a contribute action element 2580.

Figure 26:
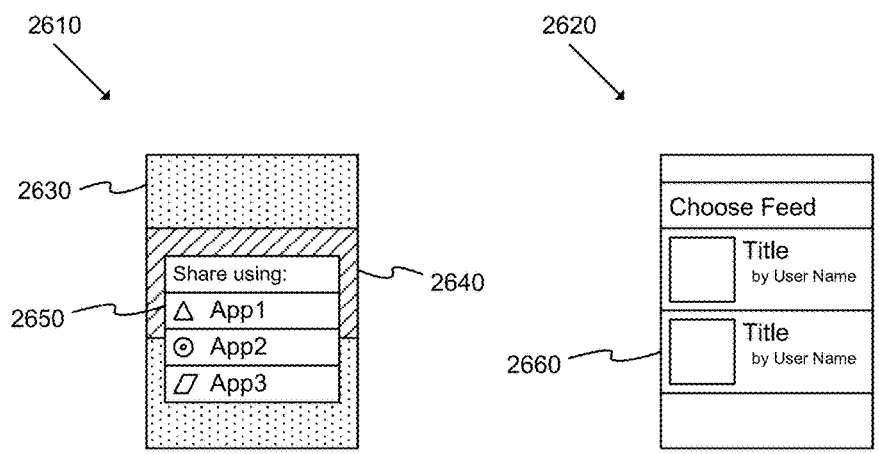
FIG. 26 illustrates GUIs that may be used to share a feed from a camera application.

FIG. 26 illustrates GUIs 2610-2620 that may be used to share a feed from a camera application. GUI 2610 may be invoked, for instance, when a user captures a picture using a camera provided by a user device. As shown, GUI 2610 may include a background area 2630, a displayed image 2640, and a listing of applications 2650 that may be used to share the image. Such applications may include email applications, social network applications, the mobile device application of some embodiments, etc. The listing 2650 may be invoked in various appropriate ways (e.g., by right-clicking the image, by selecting the image using a mobile device application of some embodiments, etc.).

GUI 2620 may be invoked, for instance, once a user makes a selection from listing 2650. As shown, GUI 2620 may include a list of feeds 2650 to choose from. Such a list of feeds may include any feeds the user owns, contributes to, and/or otherwise has sufficient privileges to share the feed. A user may make a selection from the list in order to invoke GUI 2110, for instance, such that the user may be able to add the picture to the selected feed. Alternatively, a user may be able to generate a new feed using the picture.

Although the GUIs 600-2600 have been described with reference to various specific features, elements, etc., one of ordinary skill in the art will recognize that the GUIs may be implemented in various different ways without departing from the spirit of the invention. For instance, various GUIs may be presented in various different orders than those described above. As another example, various other GUIs may be used in addition to or in place of the GUIs described above.

V. Computer System

Many of the processes and modules described above may be implemented as software processes that are specified as at least one set of instructions recorded on a non-transitory storage medium. When these instructions are executed by one or more computational element(s) (e.g., microprocessors, microcontrollers, Digital Signal Processors ("DSP"), Application-Specific ICs ("ASIC"), Field Programmable Gate Arrays ("FPGA"), etc.) the instructions cause the computational element(s) to perform actions specified in the instructions.

Figure 27:
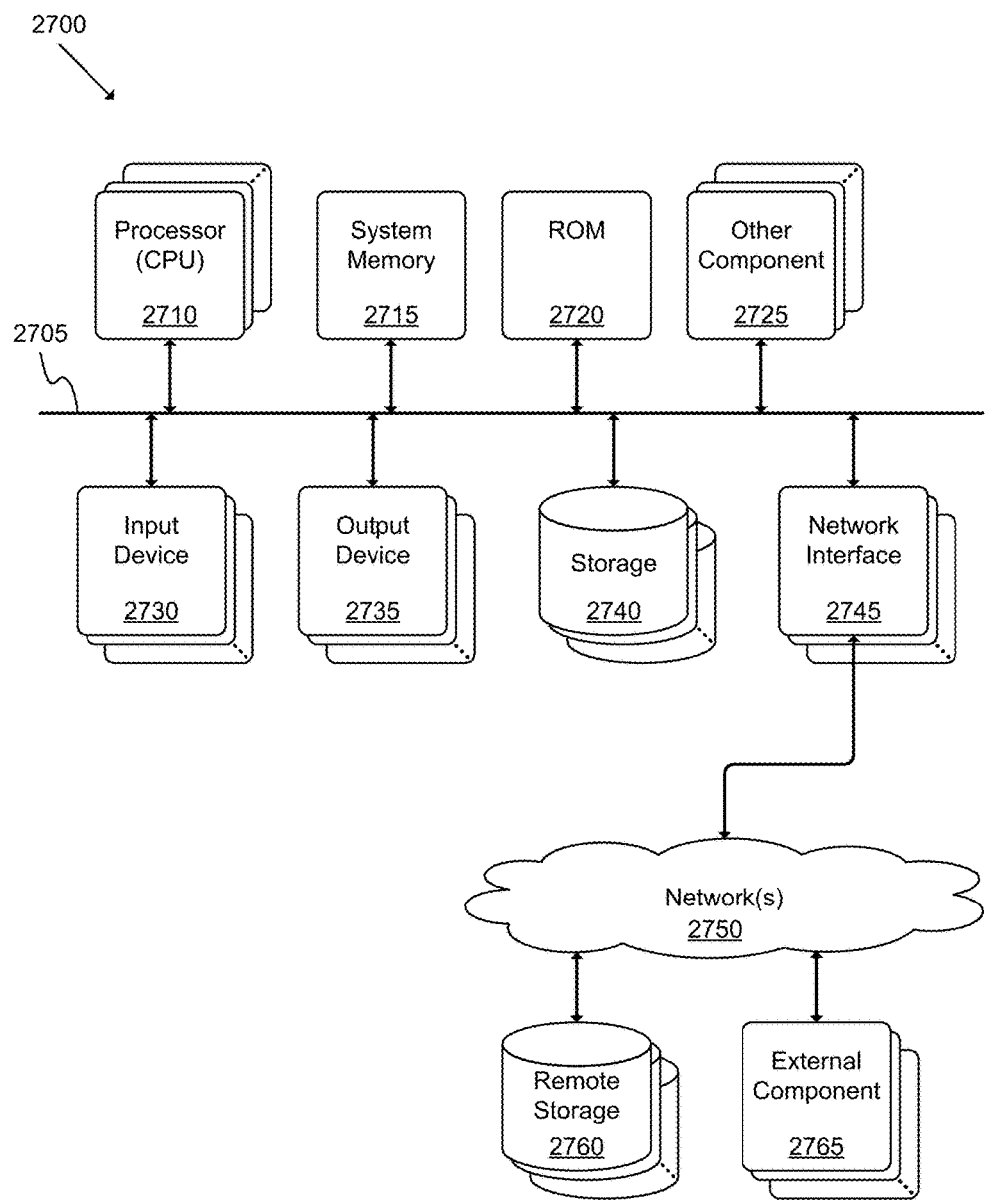
FIG. 27 conceptually illustrates a schematic block diagram of a computer system with which some embodiments of the invention may be implemented.

FIG. 27 conceptually illustrates a schematic block diagram of a computer system 2700 with which some embodiments of the invention may be implemented. For example, the systems described above in reference to FIGS. 1 and 3 may be at least partially implemented using computer system 2700. As another example, the processes described in reference to FIGS. 2 and 4-5 may be at least partially implemented using sets of instructions that are executed using computer system 2700.

Computer system 2700 may be implemented using various appropriate devices. For instance, the computer system may be implemented using one or more personal computers ("PC"), servers, mobile devices (e.g., a Smartphone), tablet devices, and/or any other appropriate devices. The various devices may work alone (e.g., the computer system may be implemented as a single PC) or in conjunction (e.g., some components of the computer system may be provided by a mobile device while other components are provided by a tablet device).

Computer system 2700 may include a bus 2705, at least one processing element 2710, a system memory 2715, a read-only memory ("ROM") 2720, other components (e.g., a graphics processing unit) 2725, input devices 2730, output devices 2735, permanent storage devices 2740, and/or network interfaces 2745. The components of computer system 2700 may be electronic devices that automatically perform operations based on digital and/or analog input signals. For instance, the various examples of GUIs described above in reference to FIGS. 6-26 may be at least partially implemented using sets of instructions that are run on computer system 2700 and displayed using the output devices 2735.

Bus 2705 represents all communication pathways among the elements of computer system 2700. Such pathways may include wired, wireless, optical, and/or other appropriate communication pathways. For example, input devices 2730 and/or output devices 2735 may be coupled to the system 2700 using a wireless connection protocol or system. The processor 2710 may, in order to execute the processes of some embodiments, retrieve instructions to execute and data to process from components such as system memory 2715, ROM 2720, and permanent storage device 2740. Such instructions and data may be passed over bus 2705.

ROM 2720 may store static data and instructions that may be used by processor 2710 and/or other elements of the computer system. Permanent storage device 2740 may be a read-and-write memory device. This device may be a non-volatile memory unit that stores instructions and data even when computer system 2700 is off or unpowered. Permanent storage device 2740 may include a mass-storage device (such as a magnetic or optical disk and its corresponding disk drive).

Computer system 2700 may use a removable storage device and/or a remote storage device as the permanent storage device. System memory 2715 may be a volatile read-and-write memory, such as a random access memory ("RAM"). The system memory may store some of the instructions and data that the processor uses at runtime. The sets of instructions and/or data used to implement some embodiments may be stored in the system memory 2715, the permanent storage device 2740, and/or the read-only memory 2720. For example, the various memory units may include instructions for pushing multimedia content to a set of subscribers in accordance with some embodiments. Other components 2725 may perform various other functions.

Input devices 2730 may enable a user to communicate information to the computer system and/or manipulate various operations of the system. The input devices may include keyboards, cursor control devices, audio input devices and/or video input devices. Output devices 2735 may include printers, displays, and/or audio devices. Some or all of the input and/or output devices may be wirelessly or optically connected to the computer system.

Finally, as shown in FIG. 27, computer system 2700 may be coupled to a network 2750 through a network interface 2745. For example, computer system 2700 may be coupled to a web server on the Internet such that a web browser executing on computer system 2700 may interact with the web server as a user interacts with an interface that operates in the web browser. In some embodiments, the network interface 2745 may include one or more APIs.

As used in this specification and any claims of this application, the terms "computer", "server", "processor", and "memory" all refer to electronic devices. These terms exclude people or groups of people. As used in this specification and any claims of this application, the term "non-transitory storage medium" is entirely restricted to tangible, physical objects that store information in a form that is readable by electronic devices. These terms exclude any wireless or other ephemeral signals.

It should be recognized by one of ordinary skill in the art that any or all of the components of computer system 2700 may be used in conjunction with the invention. Moreover, one of ordinary skill in the art will appreciate that many other system configurations may also be used in conjunction with the invention or components of the invention.

Moreover, while the examples shown may illustrate many individual modules as separate elements, one of ordinary skill in the art would recognize that these modules may be combined into a single functional block or element. One of ordinary skill in the art would also recognize that a single module may be divided into multiple modules.

While the invention has been described with reference to numerous specific details, one of ordinary skill in the art will recognize that the invention may be embodied in other specific forms without departing from the spirit of the invention. For example, several embodiments were described above by reference to particular features and/or components. However, one of ordinary skill in the art will realize that other embodiments might be implemented with other types of features and components. One of ordinary skill in the art would understand that the invention is not to be limited by the foregoing illustrative details, but rather is to be defined by the appended claims.

We claim:

1. A system that provides multimedia content to a set of users, the system comprising:

a storage device that stores a library of multimedia content items, each multimedia content item associated with a publisher-user; and a server that:
generates a sequence of multimedia content items for each of a plurality of subscriber-users, wherein the publisher-user is distinct from each of the plurality of subscriber-users, wherein a presentation order of the sequence and a presentation duration of each multimedia content item in the sequence is based at least partly on a set of attributes associated with the publisher-user and a set of attributes associated with each subscriber-user from the plurality of subscriber-users; and pushes, based on the set of attributes associated with the publisher-user and the set of attributes associated with each subscriber-user from the plurality of subscriber-users, each multimedia content item in the sequence to a destination device associated with each subscriber-user from the plurality of subscriber-users, wherein each multimedia content item is provided for use as screen background content and a display of each destination device associated with each subscriber-user from the plurality of subscriber-users is updated to provide each multimedia content item in the sequence.

2. The system of claim 1, wherein the server is further adapted to support composition of each multimedia content item by the publisher-user and automatically build and validate each multimedia content item.

3. The system of claim 1, wherein each multimedia content item comprises at least one of an image, a video, and an interactive order form.

4. The system of claim 1, wherein the server is further adapted to support association of each subscriber-user with the publisher-user through a subscription process.

5. The system of claim 4, wherein the subscription process allows the publisher-user to invite specific potential subscriber-users to utilize the subscription process and each subscriber-user to invite other potential subscriber-users to utilize the subscription process.

6. The system of claim 1, wherein the set of attributes associated with the published-user and the set of attributes associated with the subscriber user each include at least one of: time, location of the destination device, caller information, calendar information, and short message service information.

7. A method that allows a creator to generate and distribute a sequence of multimedia content items to a set of subscribers, the method comprising:

providing an online composition tool that captures and composes elements of a particular multimedia content item;

providing a plurality of distribution templates, receiving a selection of a particular distribution template, and applying the particular distribution template to the particular multimedia content item;

setting values for metadata associated with the particular multimedia content item and properties for controlling distribution of the particular multimedia content item;

uploading the particular multimedia content item to a distribution server in order to make the particular multimedia content item available to the set of subscribers;

associating the particular multimedia content item with the sequence of multimedia content items, wherein a presentation order of the sequence of multimedia content items and a presentation duration of each multimedia content item in the sequence of multimedia content items is based at least partly on a set of attributes associated with the creator and a set of attributes associated with each subscriber in the set of subscribers; and pushing, based on a set of attributes associated with the creator and a set of attributes associated with each subscriber from the set of subscribers, the sequence of multimedia content items to a plurality of devices, each device associated with a particular subscriber from the set of subscribers, wherein the particular multimedia content item is provided for use as screen background content.

8. The method of claim 7, wherein pushing the particular multimedia content item comprises determining whether an update interval has been met, the update interval established based at least partly on at least one of subscriber and creator preference.

9. The method of claim 7, wherein pushing the particular multimedia content item comprises determining whether each subscriber in the set of subscribers has provided valid login information.

10. The method of claim 7, wherein the online composition tool comprises a distribution center offering prepared templates that may be customized by the creator.

11. The method of claim 7, wherein the online composition tool comprises a studio that allows combination and layout of a plurality of arbitrary elements.

12. The method of claim 11, wherein the studio is able to be executed by a mobile device.

13. The method of claim 11, wherein the studio is able to be executed using a web portal.

14. A server that provides at least one multimedia content item to a set of destination devices, the server comprising:
a processor for executing sets of instructions; and
a non-transitory medium that stores the sets of instructions, wherein the sets of instructions comprise:
retrieving a particular multimedia content item from a storage that stores multimedia content items composed by a set of creators;
offering a listing of multimedia content items that are available to users to select, download, and install; and
based upon satisfaction of a set of evaluation criteria including receipt of a publish command from a creator associated with the at least one multimedia content item, pushing the at least one multimedia content item to the set of destination devices, wherein each destination device in the set is associated with a user that has selected content offered by the creator associated with the at least one multimedia content item, wherein the at least one multimedia content item is provided for use as screen background content.

15. The server of claim 14, wherein the set of evaluation criteria includes an interval associated with at least one of a selection made by the user that has selected content and the preference of the creator associated with the at least one multimedia content item.

16. The server of claim 14, wherein the set of evaluation criteria includes validating user login information.

17. The server of claim 14, wherein the sets of instructions further comprise establishing associations among users and creators through a subscription process.

18. A server that allows a creator to compose a sequence of multimedia content items, the server comprising:
a processor for executing sets of instructions; and
a non-transitory medium that stores the sets of instructions, wherein the sets of instructions comprise:
providing an online composition tool that allows the creator to capture and compose elements of each multimedia content item in the sequence of multimedia content items;
offering at least one distribution template that may be applied to the sequence of multimedia content items;
setting values for metadata associated with each multimedia content item in the sequence of multimedia content items and properties for controlling distribution of the sequence of multimedia content items;
sending the sequence of multimedia content items to a distribution server such that the sequence of multimedia content items is made available to a plurality of subscribers, each subscriber from the plurality of subscribers being distinct from the creator, wherein the sequence of multimedia content items is provided for use as screen background content; and
pushing, based on a set of attributes associated with the creator and a set of attributes associated with each subscriber from the plurality of subscribers, each multimedia content item in the sequence of multimedia content items to a user device associated with each subscriber from the plurality of subscribers, wherein the set of attributes associated with the published-user and the set of attributes associated with the subscriber user each include at least one of: time, location of the destination device, caller information, calendar information, and short message service information.

19. The server of claim 18, wherein the online composition tool comprises a studio that allows combination and layout of multiple arbitrary elements.

20. The server of claim 18, wherein the online composition tool comprises a distribution center offering prepared templates that may be customized by the creator.

21. The server of claim 18, wherein the sets of instructions further comprise automatically building and validating each multimedia content item composed by the creator.

* * * * *